(12) United States Patent
Doujou

(10) Patent No.: US 10,634,872 B2
(45) Date of Patent: Apr. 28, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Naoto Doujou, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/005,784

(22) Filed: Jun. 12, 2018

(65) Prior Publication Data
US 2018/0372992 A1 Dec. 27, 2018

(30) Foreign Application Priority Data
Jun. 27, 2017 (JP) ................. 2017-124914
Feb. 15, 2018 (JP) ................. 2018-024598

(51) Int. Cl.
| | |
|---|---|
| *G02B 9/06* | (2006.01) |
| *G02B 27/00* | (2006.01) |
| *H04N 5/30* | (2006.01) |
| *G02B 7/10* | (2006.01) |
| *G02B 13/16* | (2006.01) |
| *G02B 13/14* | (2006.01) |
| *G01J 5/10* | (2006.01) |

(52) U.S. Cl.
CPC ............. *G02B 9/06* (2013.01); *G02B 7/10* (2013.01); *G02B 13/14* (2013.01); *G02B 13/16* (2013.01); *G02B 27/0037* (2013.01); *H04N 5/30* (2013.01); *G01J 5/10* (2013.01)

(58) Field of Classification Search
CPC ........ G02B 13/003; G02B 13/18; G02B 9/06; G02B 9/08; G02B 13/006
USPC ......................................................... 359/794
See application file for complete search history.

(56) References Cited

U.S. PATENT DOCUMENTS

| | | | | |
|---|---|---|---|---|
| 5,909,307 A | * | 6/1999 | Koyama | ............... G02B 13/14 359/356 |
| 9,007,683 B2 | | 4/2015 | Kubala et al. | |
| 2003/0210341 A1 | * | 11/2003 | Isono | ....................... G02B 9/04 348/335 |
| 2007/0201141 A1 | * | 8/2007 | Kato | ....................... G02B 9/04 359/680 |

FOREIGN PATENT DOCUMENTS

| | | |
|---|---|---|
| JP | 2000075203 A | 3/2000 |
| JP | 2017090786 A | 5/2017 |
| WO | 2016121857 A | 8/2016 |

* cited by examiner

*Primary Examiner* — Mohammed A Hasan
(74) *Attorney, Agent, or Firm* — Carter, DeLuca & Farrell LLP

(57) ABSTRACT

Provided is an optical system including, in order from an object side to an image side: a first lens having a positive refractive power and having a meniscus shape with a convex surface facing the object side; and a second lens having a positive refractive power and having a meniscus shape with a convex surface facing the object side, wherein the first lens is made of a silicon material, wherein the second lens is made of one of a silicon material and a germanium material, and wherein a focal length of the entire optical system and a distance on an optical axis between the first lens and the second lens are each appropriately set.

11 Claims, 21 Drawing Sheets

OPTICAL SYSTEM AND IMAGE PICKUP APPARATUS INCLUDING THE SAME

BACKGROUND OF THE INVENTION

Field of the Invention

The present invention relates to an optical system, which is configured to obtain an infrared image through use of, for example, an infrared ray having a wavelength of from about 8 μm to about 13 μm, and is suitable for an image pickup apparatus, such as a monitoring camera and an in-vehicle camera.

Description of the Related Art

When an optical system (infrared optical system) for transmitting light in an infrared range (wavelength of from about 8 μm to about 13 μm) is used, it is possible to detect and visualize heat information, for example, a temperature distribution of a human body, which cannot be obtained in a visible wavelength range (wavelength of from 0.4 μm to 0.7 μm). As a material of a lens included in the infrared optical system, there is given a material (infrared material) that transmits light in the infrared range, such as germanium (Ge), gallium arsenide (GaAs), chalcogenide, zinc selenide (ZnSe), zinc sulfide (ZnS), and silicon (Si).

In Japanese Patent Application Laid-Open No. 2000-75203, there is disclosed an optical system including two lenses made of germanium or two lenses made of silicon. In U.S. Pat. No. 9,007,683, there is disclosed an optical system including two lenses made of silicon. In addition, there is disclosed an optical system including two lenses, which are a lens made of chalcogenide or zinc selenide and a lens made of any one of silicon, gallium arsenide, germanium, and chalcogenide.

Chalcogenide, zinc selenide, and zinc sulfide have a great negative effect on a human body. Further, in order to form an optical system having a high resolution through use of zinc selenide or zinc sulfide, which has a low refractive index and a high dispersion, a large number of lenses are required to correct various aberrations including a chromatic aberration and a curvature of field. Moreover, germanium is a rare metal, and hence it is difficult to form an optical system only through use of a lens made of germanium.

SUMMARY OF THE INVENTION

It is an object of the present invention to provide an optical system capable of easily achieving high optical performance in an infrared range.

According to one embodiment of the present invention, there is provided an optical system including in order from an object side to an image side: a first lens having a positive refractive power and having a meniscus shape with a convex surface facing the object side; and a second lens having a positive refractive power and having a meniscus shape with a convex surface facing the object side, wherein the first lens is made of a silicon material, wherein the second lens is made of one of a silicon material and a germanium material, and wherein the conditional expression:

$$0.90 < D/f < 2.00,$$

is satisfied where f represents a focal length of the optical system, and D represents a distance on an optical axis between the first lens and the second lens.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A configuration of an optical system according to each Embodiment of the present invention is described. The optical system according to each Embodiment is an infrared optical system, which is configured to form an infrared image through use of an infrared ray having a wavelength of from 8 μm to 13 μm. The optical system according to each Embodiment includes, in order from an object side to an image side, a first lens having a positive refractive power and having a meniscus shape with a convex surface facing the object side, and a second lens having a positive refractive power and having a meniscus shape with a convex surface facing the object side. Further, an image pickup apparatus according to one embodiment of the present invention includes an optical system and an image pickup element (infrared sensor) configured to receive an image formed by the optical system.

Figure 1:
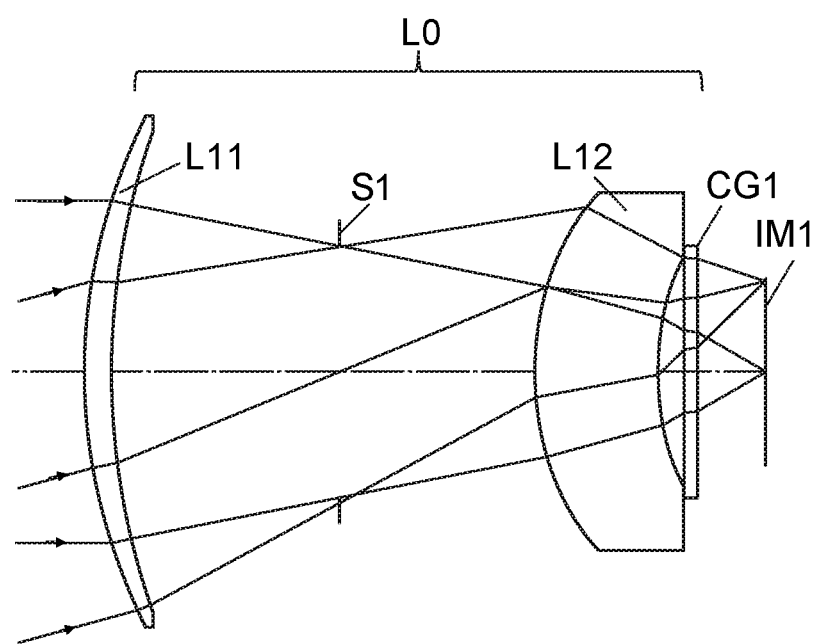
FIG. 1 is a lens cross-sectional view in Embodiment 1 of the present invention.
Figure 2A:
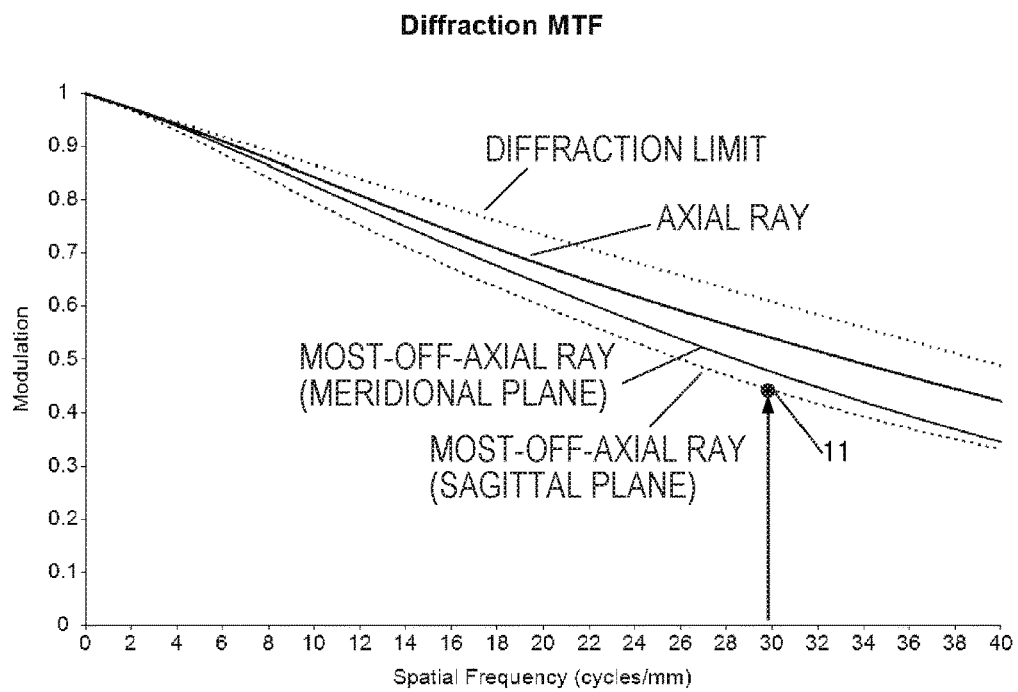
FIG. 2A is a modulation transfer function (MTF) graph in Embodiment 1.
Figure 2B:
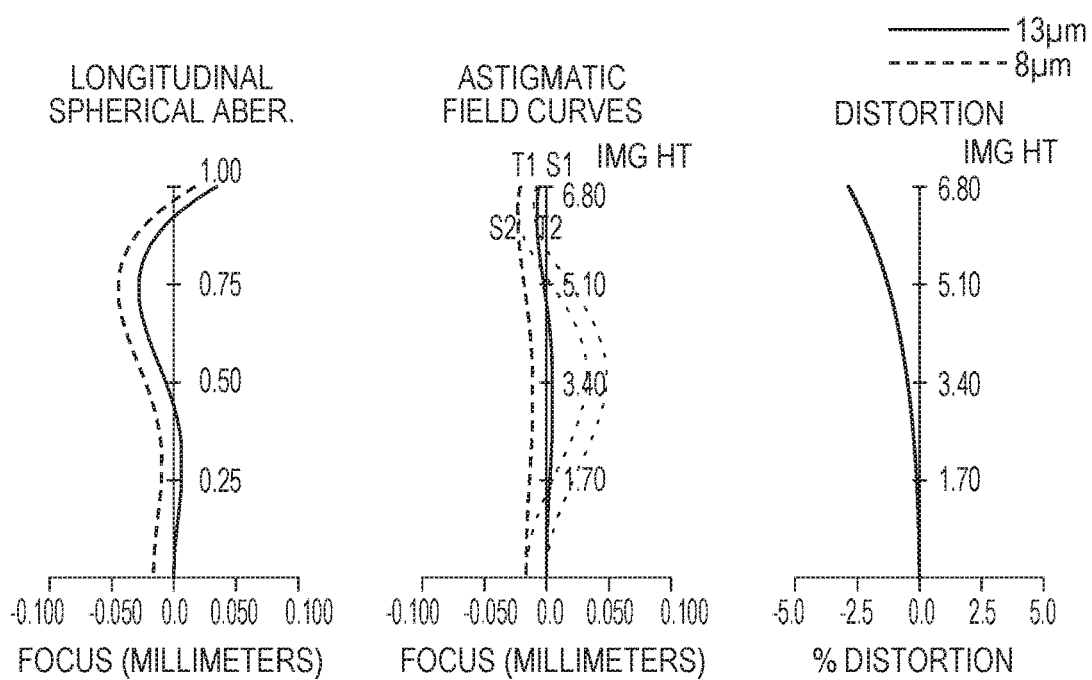
FIG. 2B is longitudinal aberration diagrams in Embodiment 1.

FIG. 1 is a lens cross-sectional view of an optical system according to Embodiment 1 of the present invention. FIG. 2A and FIG. 2B are a modulation transfer function (MTF) graph and longitudinal aberration diagrams, respectively, in the optical system according to Embodiment 1.

Figure 3:
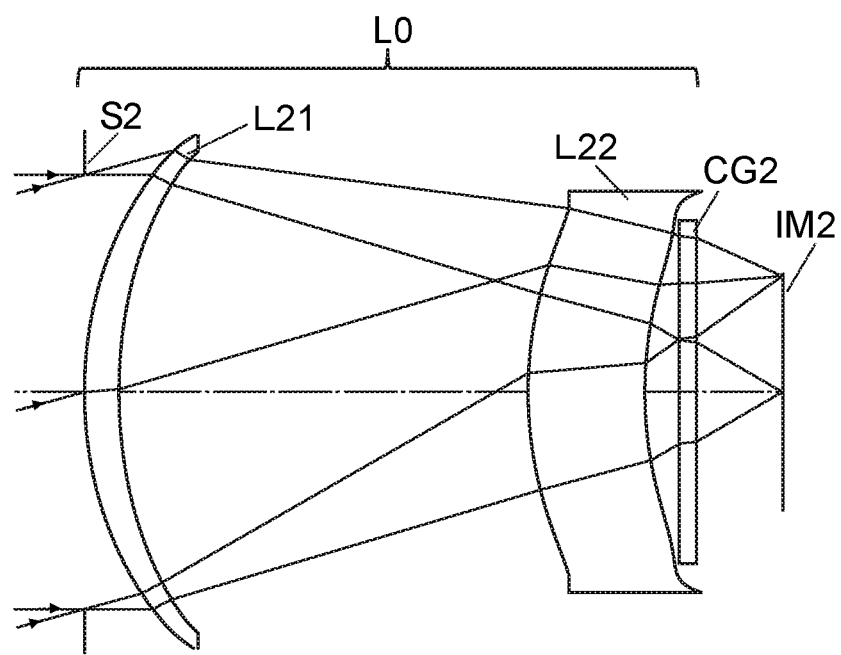
FIG. 3 is a lens cross-sectional view in Embodiment 2 of the present invention.
Figure 4A:
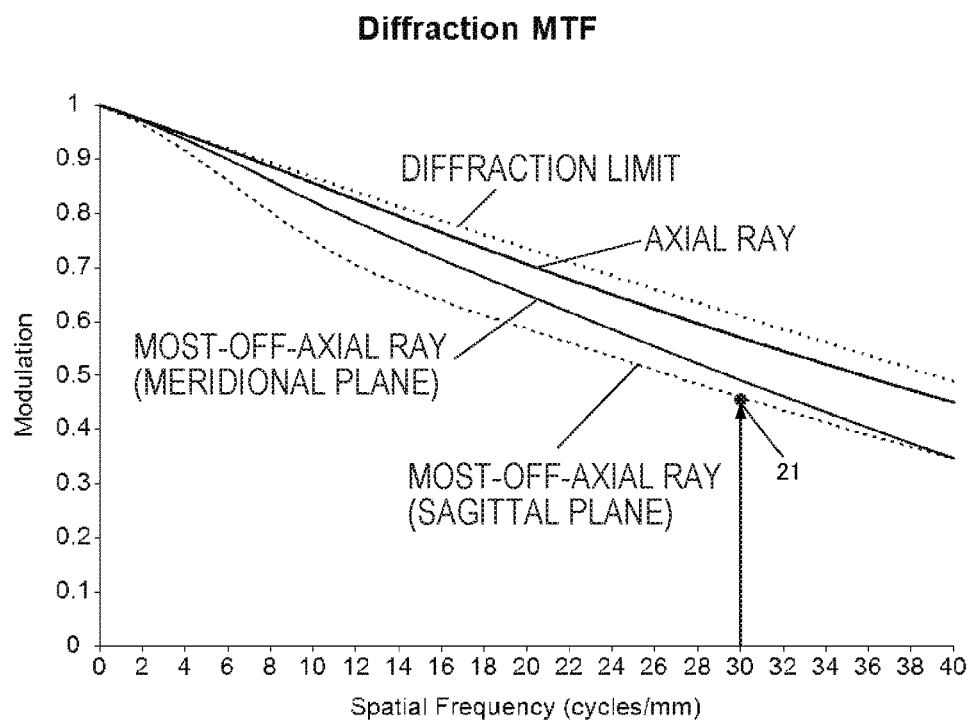
FIG. 4A is an MTF graph in Embodiment 2.
Figure 4B:
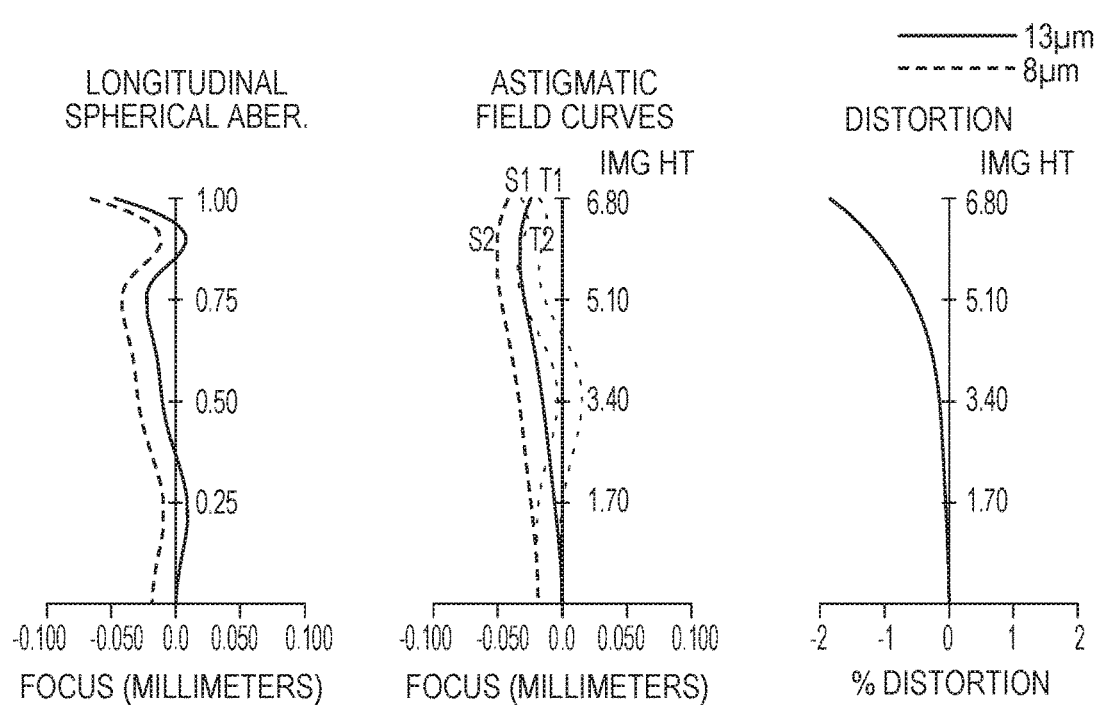
FIG. 4B is longitudinal aberration diagrams in Embodiment 2.

FIG. 3 is a lens cross-sectional view of an optical system according to Embodiment 2 of the present invention. FIG. 4A and FIG. 4B are an MTF graph and longitudinal aberration diagrams, respectively, in the optical system according to Embodiment 2.

Figure 5:
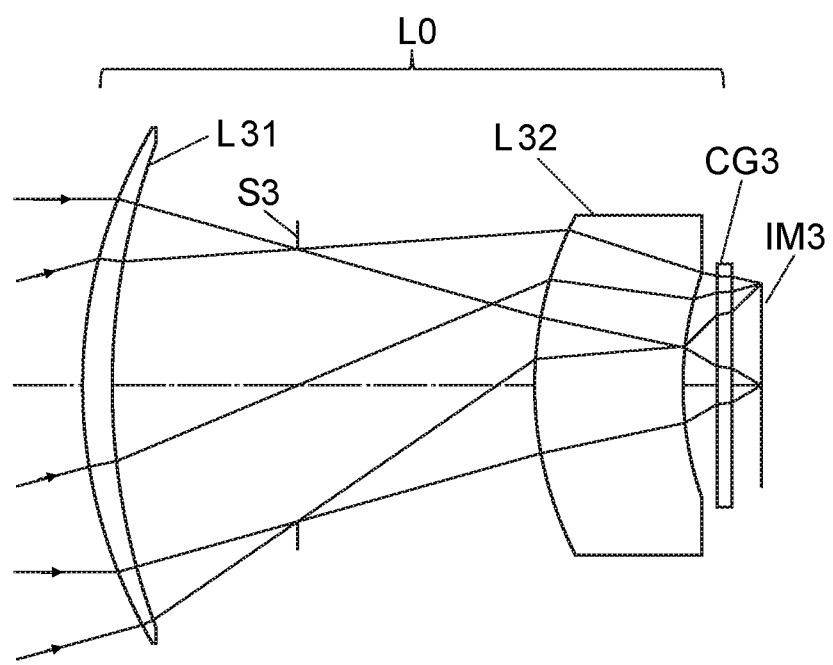
FIG. 5 is a lens cross-sectional view in Embodiment 3 of the present invention.
Figure 6A:
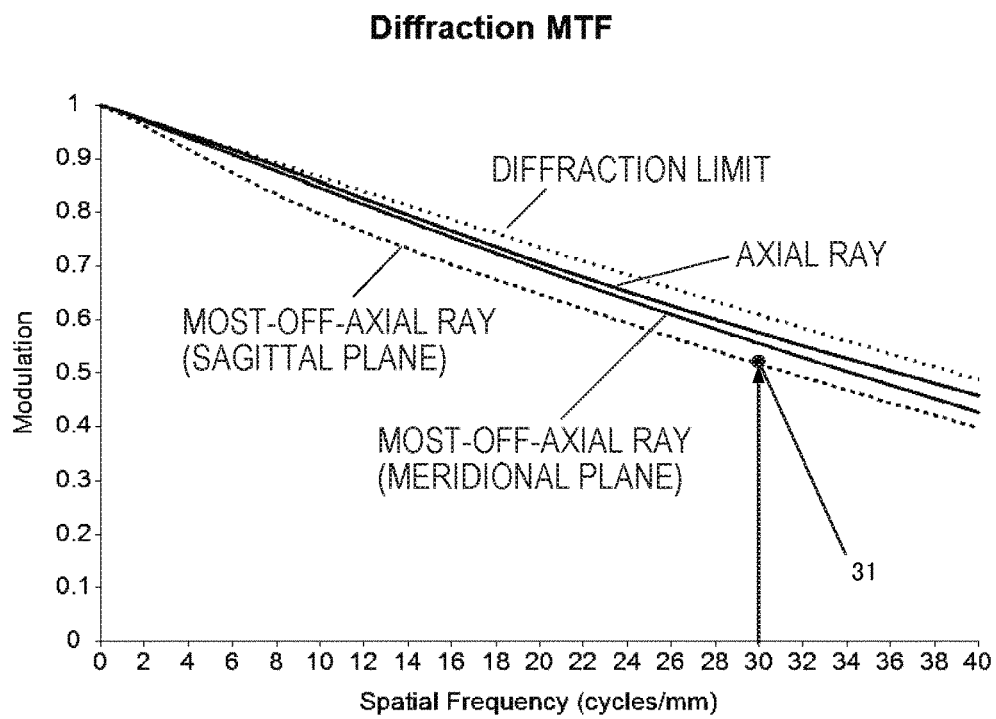
FIG. 6A is an MTF graph in Embodiment 3.
Figure 6B:
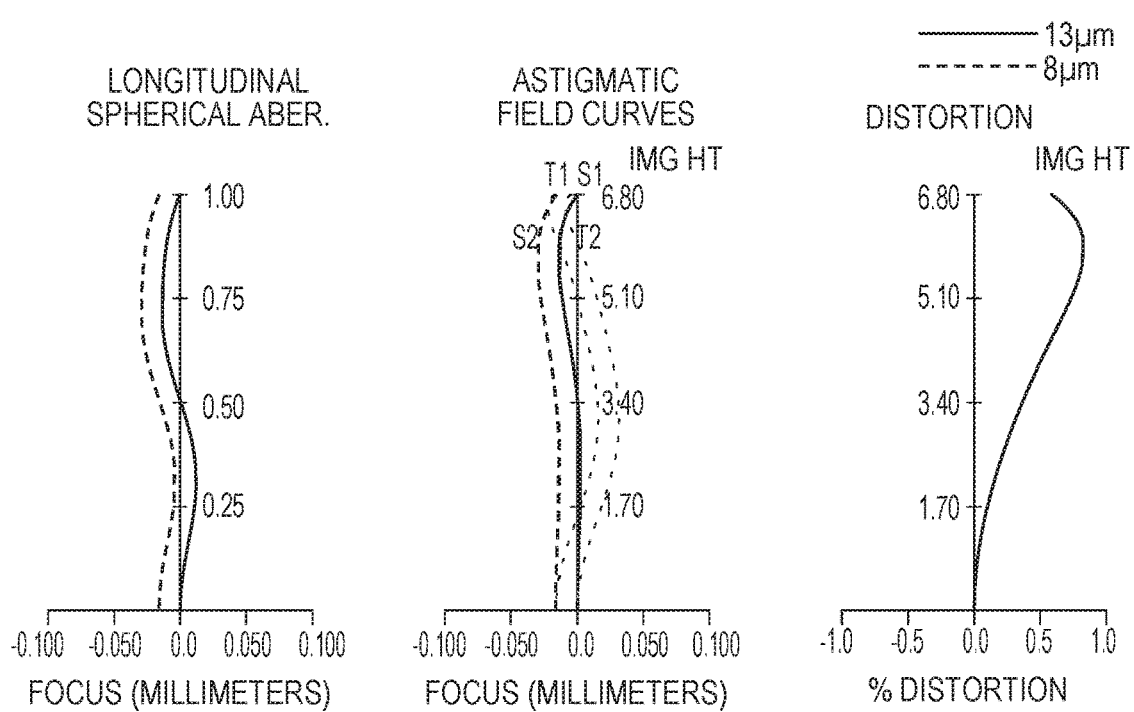
FIG. 6B is longitudinal aberration diagrams in Embodiment 3.

FIG. 5 is a lens cross-sectional view of an optical system according to Embodiment 3 of the present invention. FIG. 6A and FIG. 6B are an MTF graph and longitudinal aberration diagrams, respectively, in the optical system according to Embodiment 3.

Figure 7:
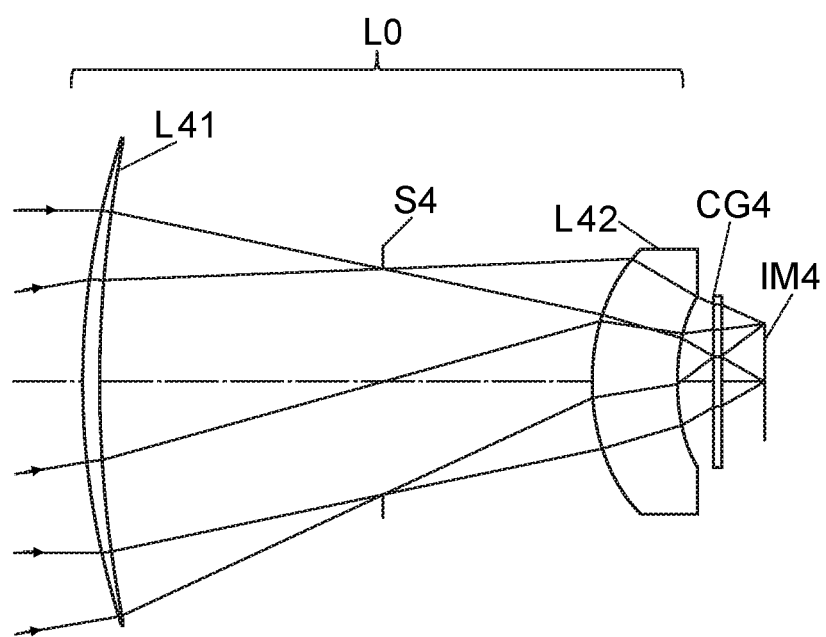
FIG. 7 is a lens cross-sectional view in Embodiment 4 of the present invention.
Figure 8A:
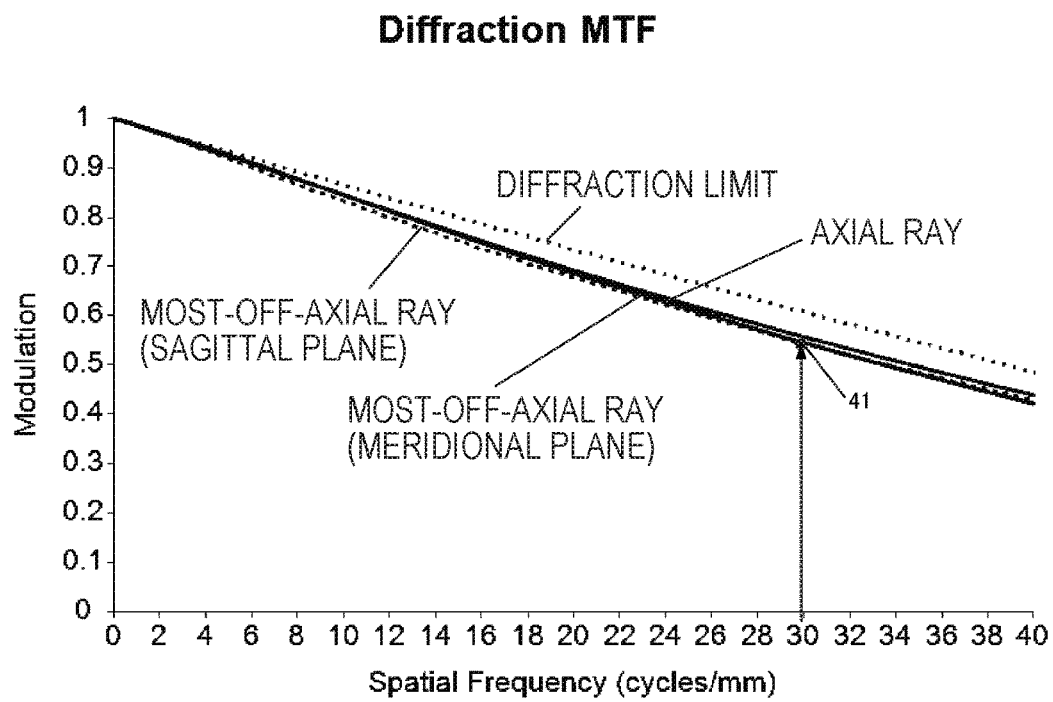
FIG. 8A is an MTF graph in Embodiment 4.
Figure 8B:
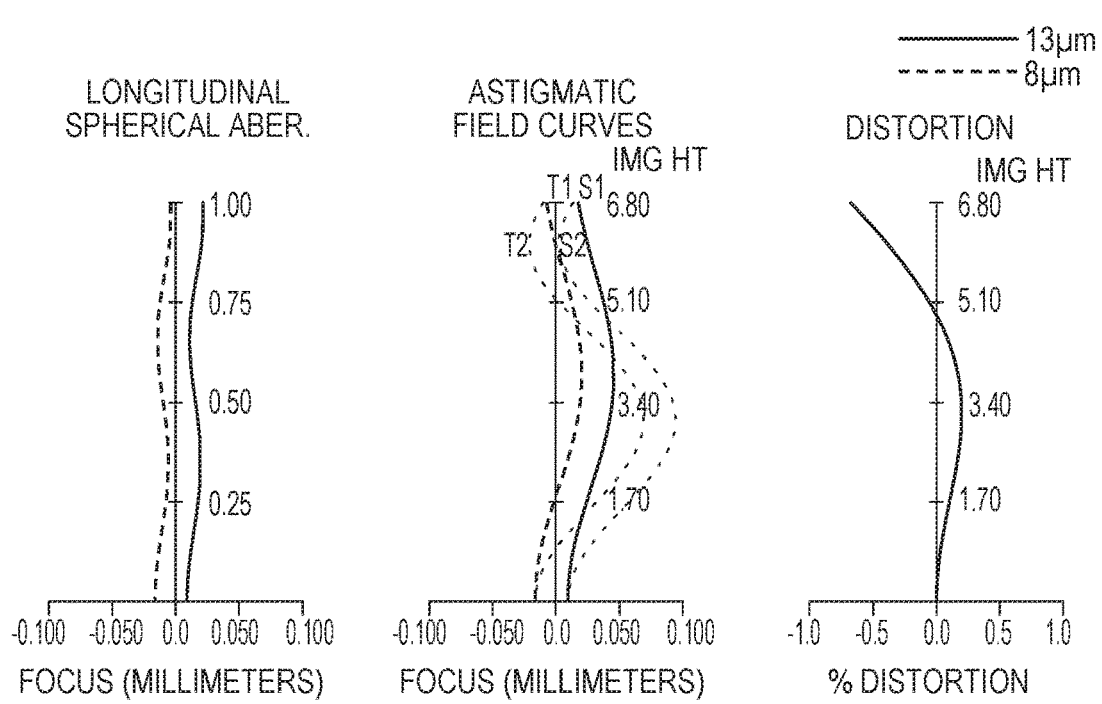
FIG. 8B is longitudinal aberration diagrams in Embodiment 4.

FIG. 7 is a lens cross-sectional view of an optical system according to Embodiment 4 of the present invention. FIG. 8A and FIG. 8B are an MTF graph and longitudinal aberration diagrams, respectively, in the optical system according to Embodiment 4.

Figure 9:
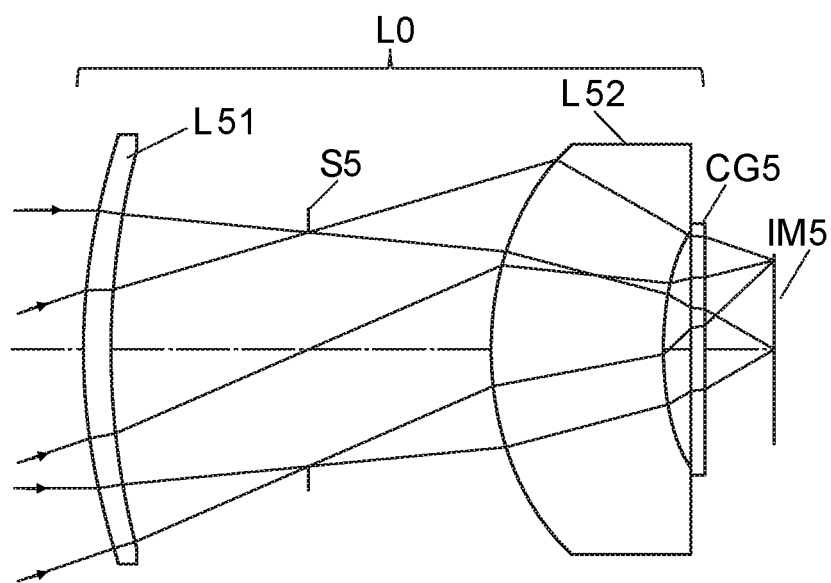
FIG. 9 is a lens cross-sectional view in Embodiment 5 of the present invention.
Figure 10A:
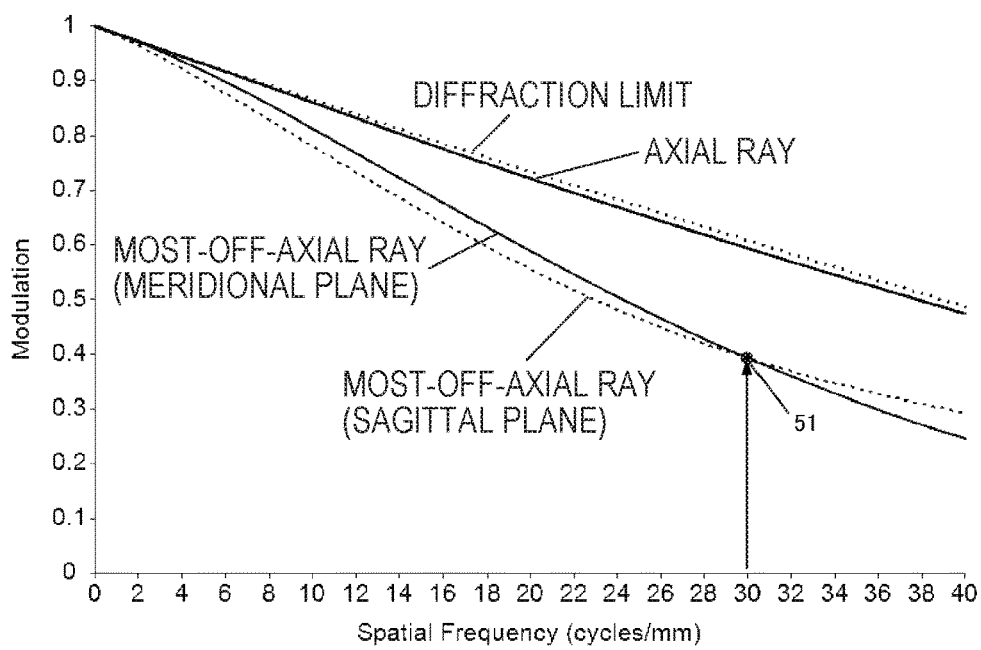
FIG. 10A is an MTF graph in Embodiment 5.
Figure 10B:
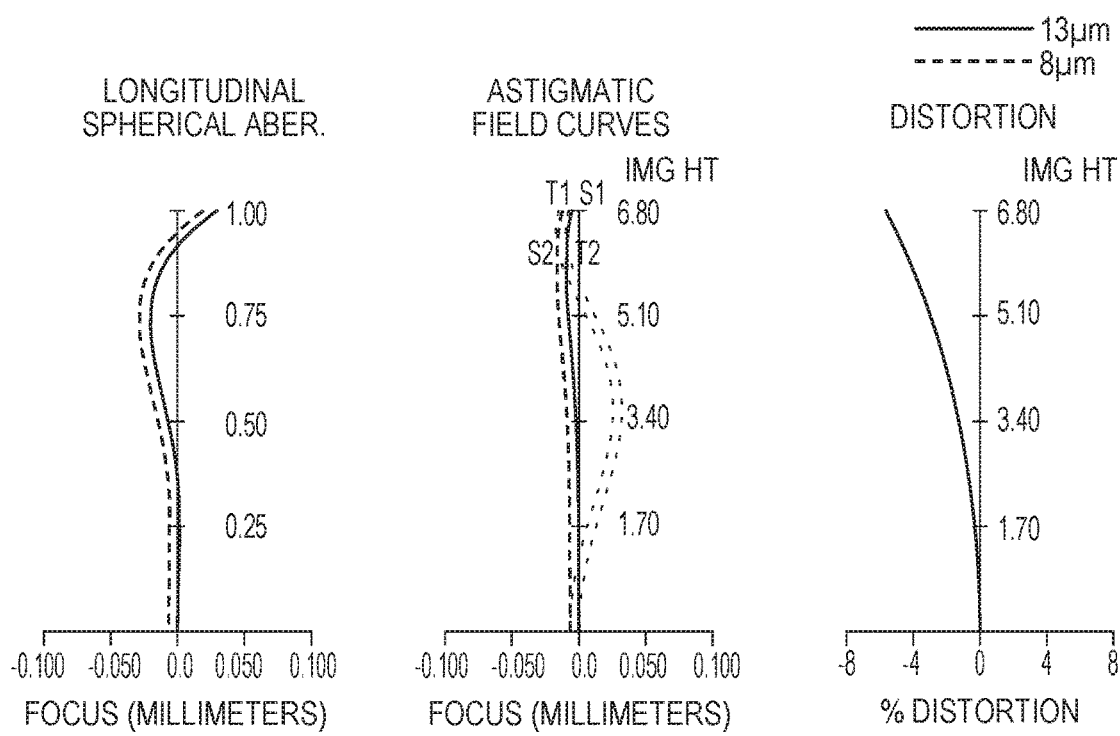
FIG. 10B is longitudinal aberration diagrams in Embodiment 5.

FIG. 9 is a lens cross-sectional view of an optical system according to Embodiment 5 of the present invention. FIG. 10A and FIG. 10B are an MTF graph and longitudinal aberration diagrams, respectively, in the optical system according to Embodiment 5.

Figure 11:
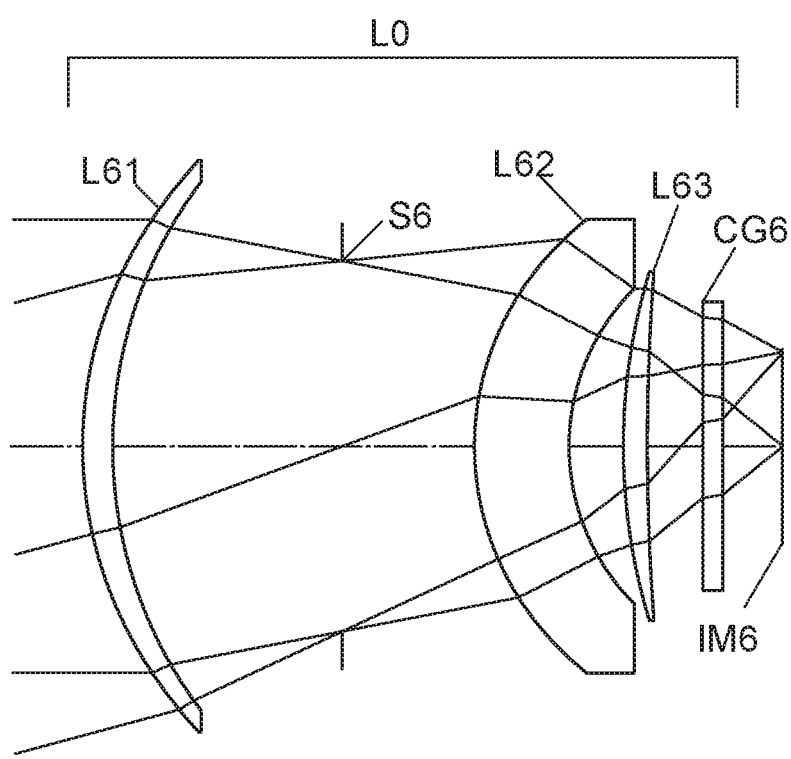
FIG. 11 is a lens cross-sectional view in Embodiment 6 of the present invention.
Figure 12A:
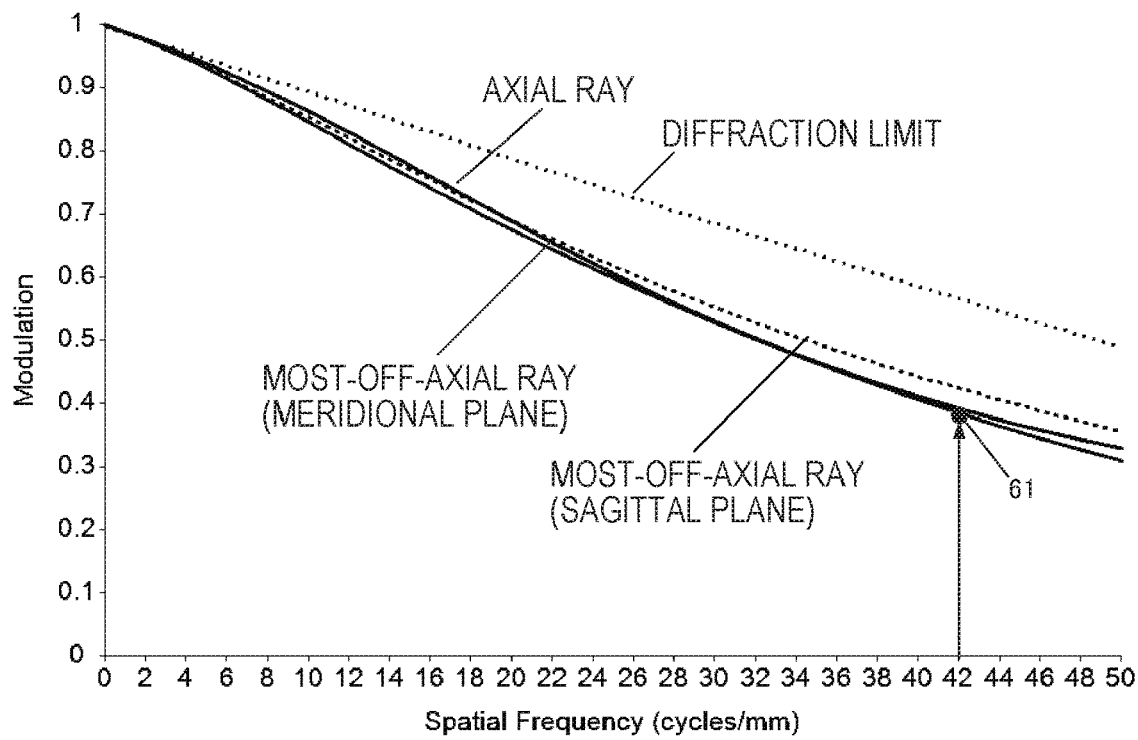
FIG. 12A is an MTF graph in Embodiment 6.
Figure 12B:
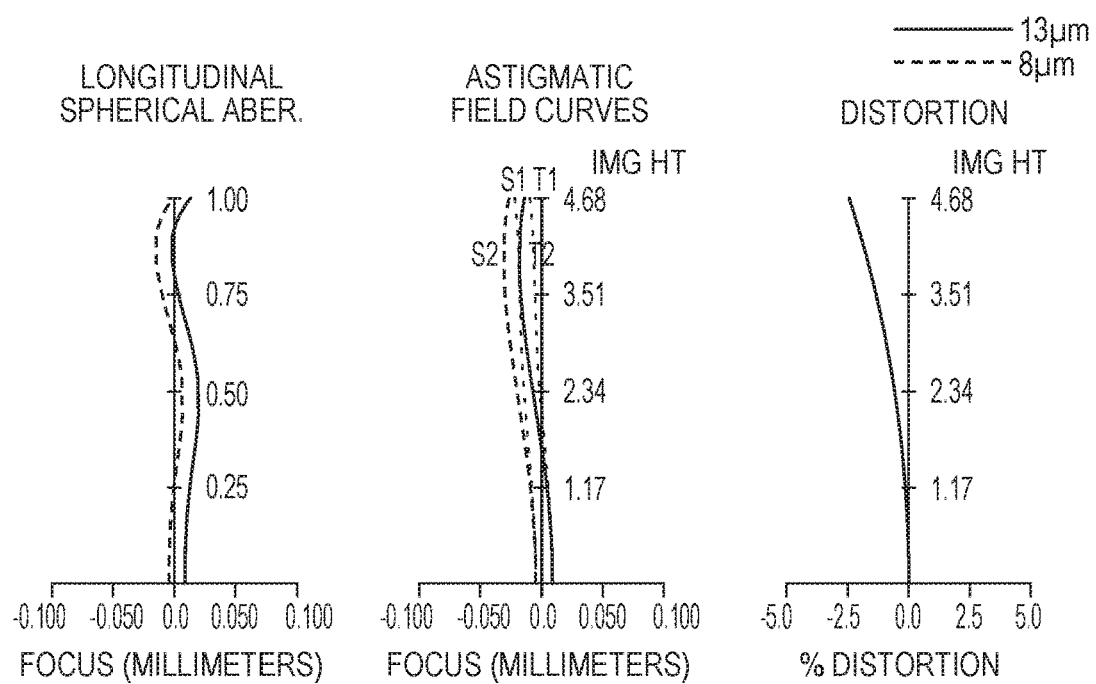
FIG. 12B is longitudinal aberration diagrams in Embodiment 6.

FIG. 11 is a lens cross-sectional view of an optical system according to Embodiment 6 of the present invention. FIG. 12A and FIG. 12B are an MTF graph and longitudinal aberration diagrams, respectively, in the optical system according to Embodiment 6.

Figure 13:
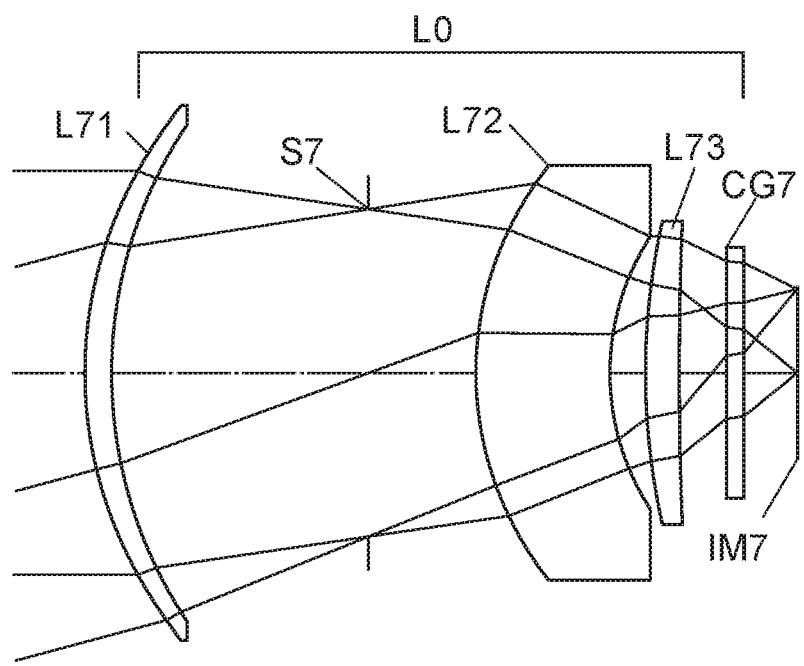
FIG. 13 is a lens cross-sectional view in Embodiment 7 of the present invention.
Figure 14A:
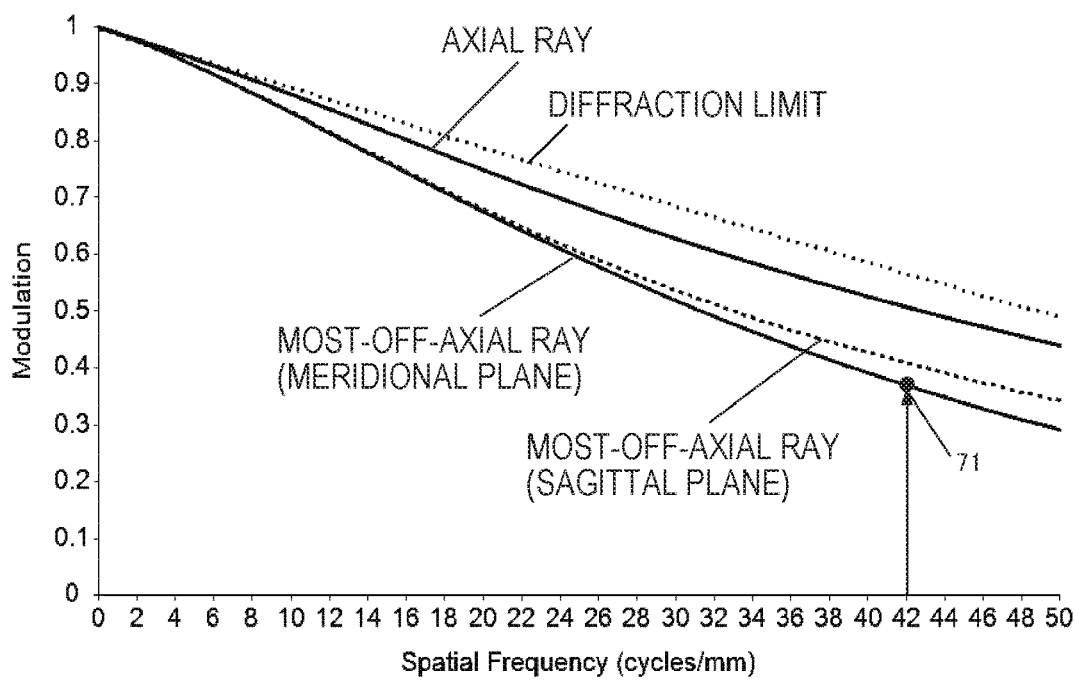
FIG. 14A is an MTF graph in Embodiment 7.
Figure 14B:
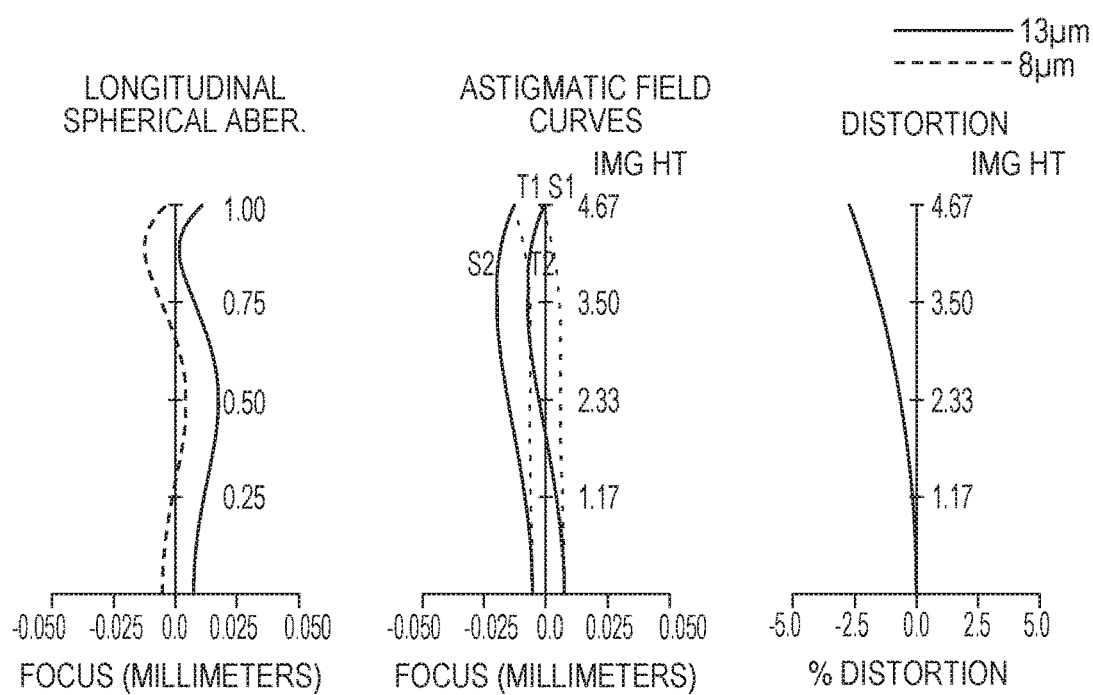
FIG. 14B is longitudinal aberration diagrams in Embodiment 7.

FIG. 13 is a lens cross-sectional view of an optical system according to Embodiment 7 of the present invention. FIG. 14A and FIG. 14B are an MTF graph and longitudinal aberration diagrams, respectively, in the optical system according to Embodiment 7.

Figure 15:
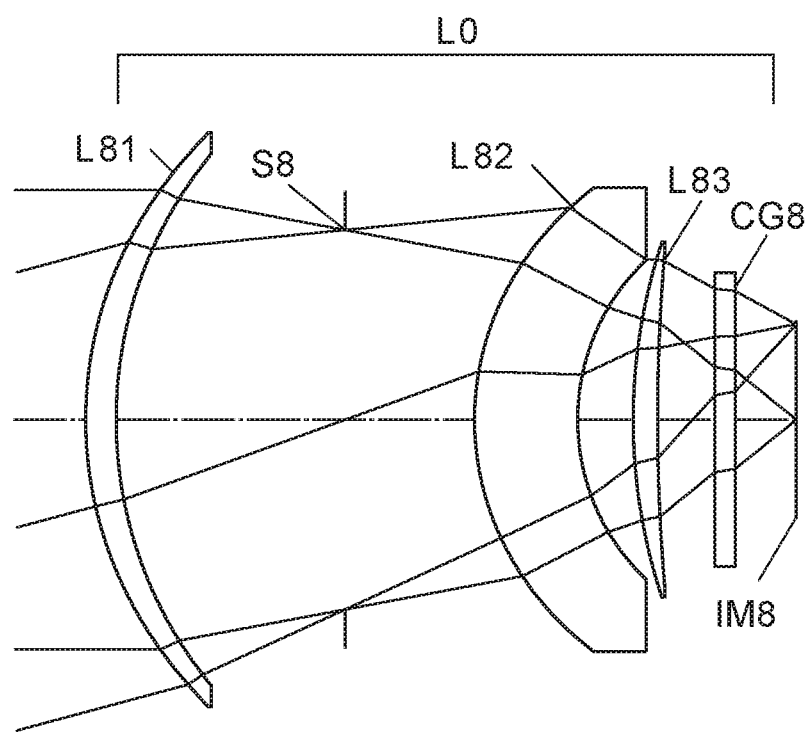
FIG. 15 is a lens cross-sectional view in Embodiment 8 of the present invention.
Figure 16A:
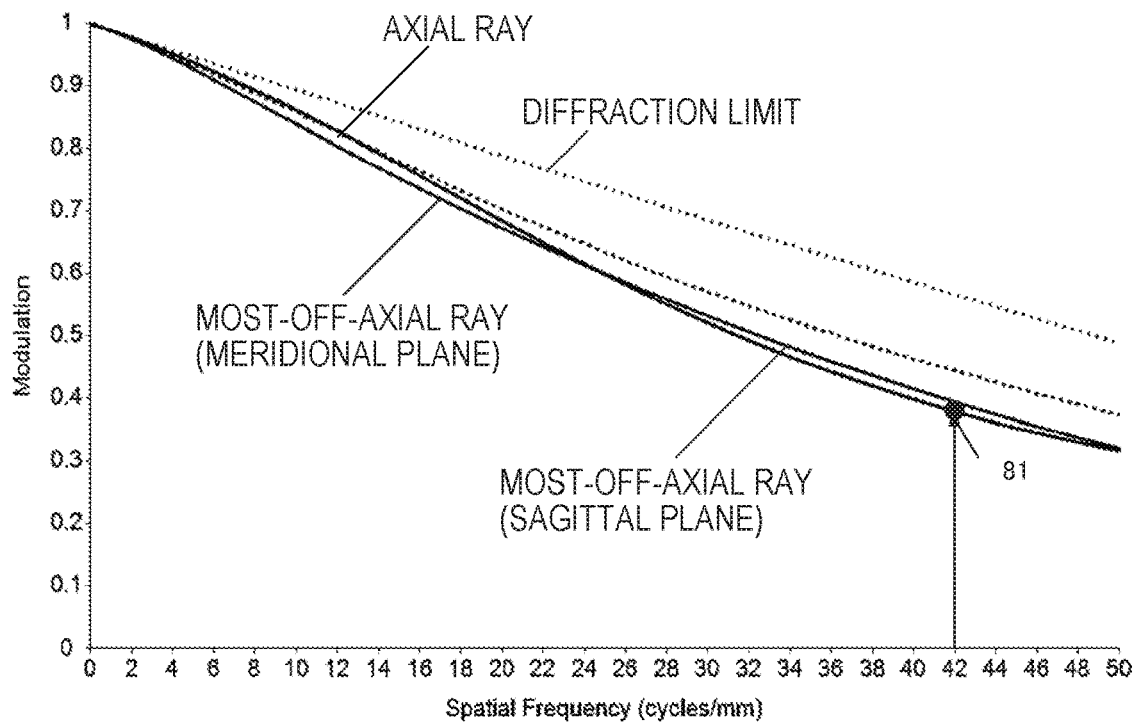
FIG. 16A is an MTF graph in Embodiment 8.
Figure 16B:
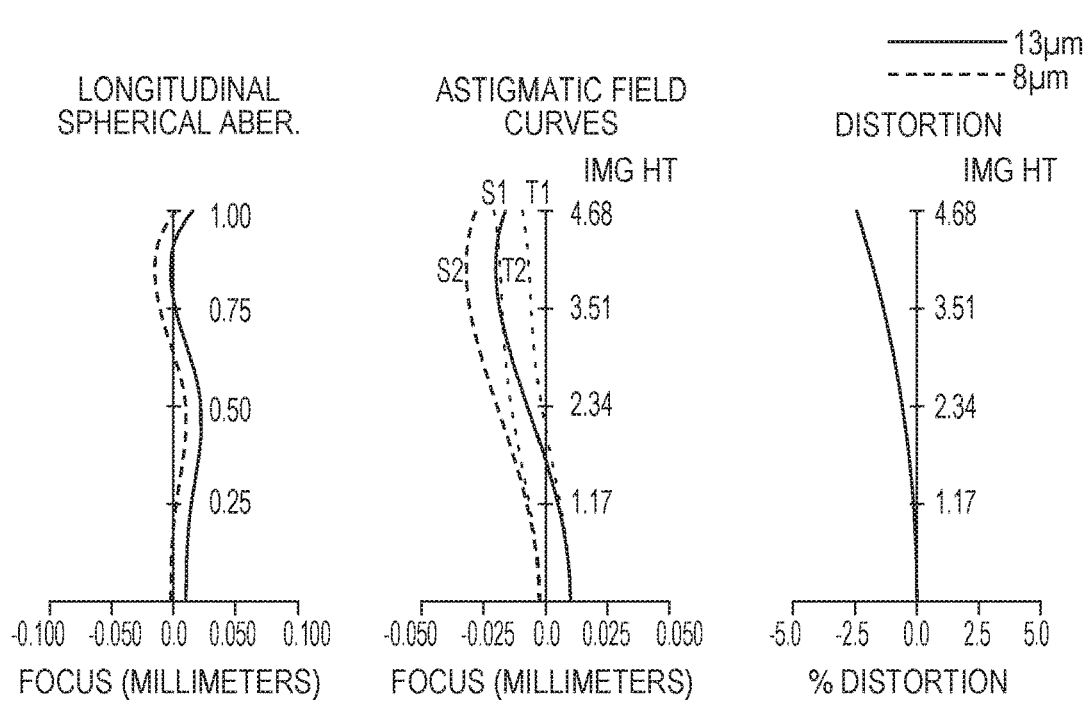
FIG. 16B is longitudinal aberration diagrams in Embodiment 8.

FIG. 15 is a lens cross-sectional view of an optical system according to Embodiment 8 of the present invention. FIG. 16A and FIG. 16B are an MTF graph and longitudinal aberration diagrams, respectively, in the optical system according to Embodiment 8.

Figure 17:
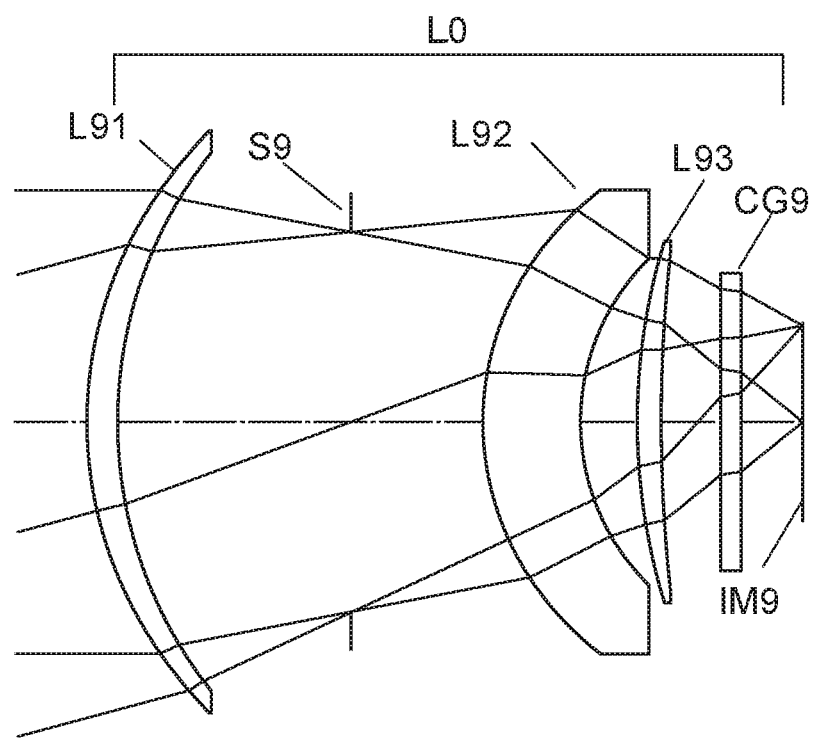
FIG. 17 is a lens cross-sectional view in Embodiment 9 of the present invention.
Figure 18A:
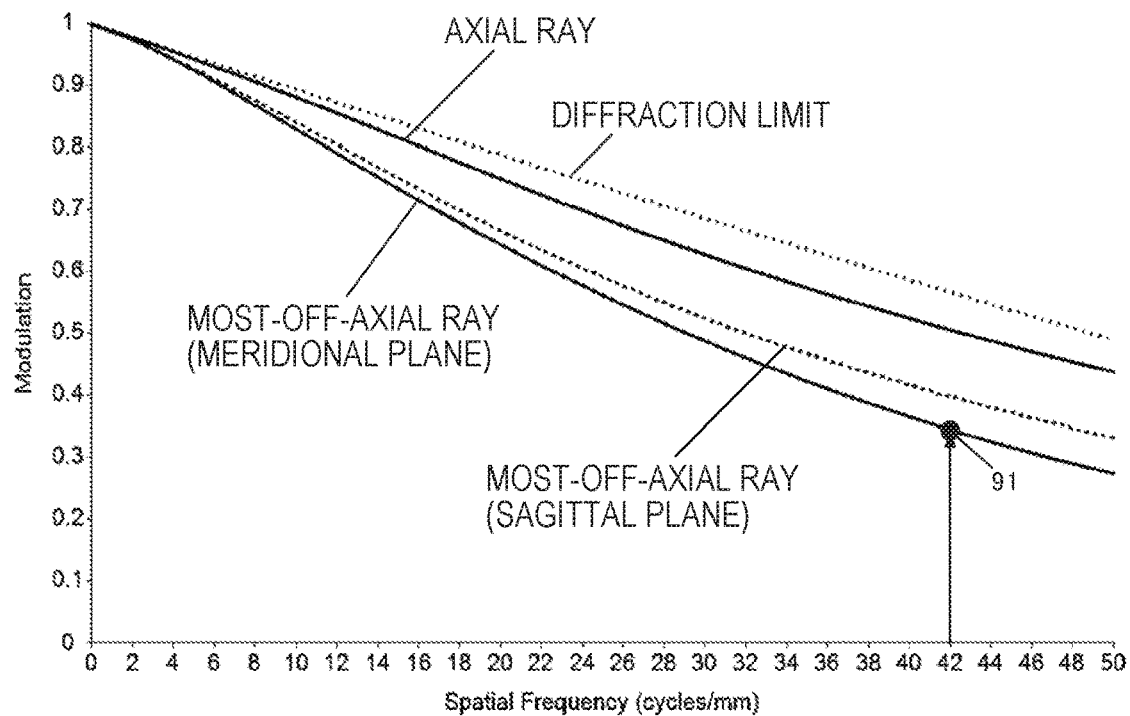
FIG. 18A is an MTF graph in Embodiment 9.
Figure 18B:
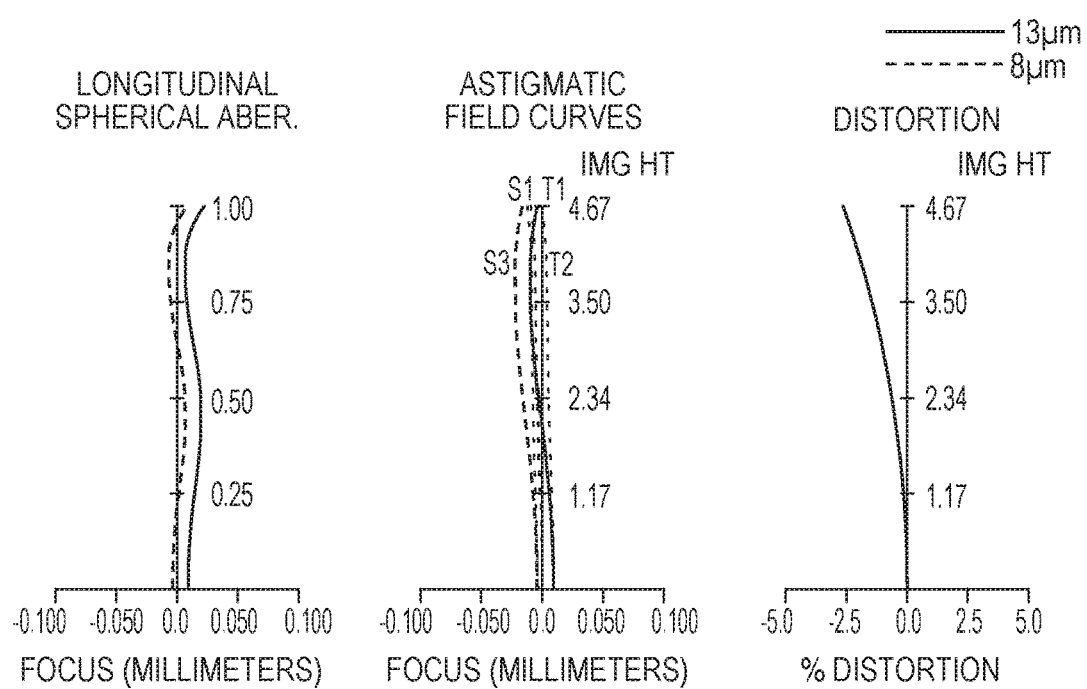
FIG. 18B is longitudinal aberration diagrams in Embodiment 9.

FIG. 17 is a lens cross-sectional view of an optical system according to Embodiment 9 of the present invention. FIG. 18A and FIG. 18B are an MTF graph and longitudinal aberration diagrams, respectively, in the optical system according to Embodiment 9.

Figure 19:
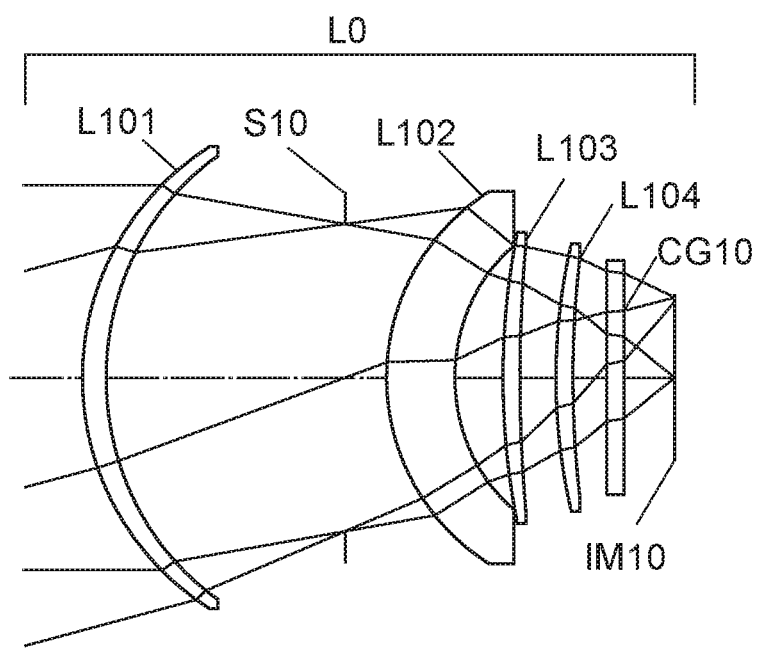
FIG. 19 is a lens cross-sectional view in Embodiment 10 of the present invention.
Figure 20A:
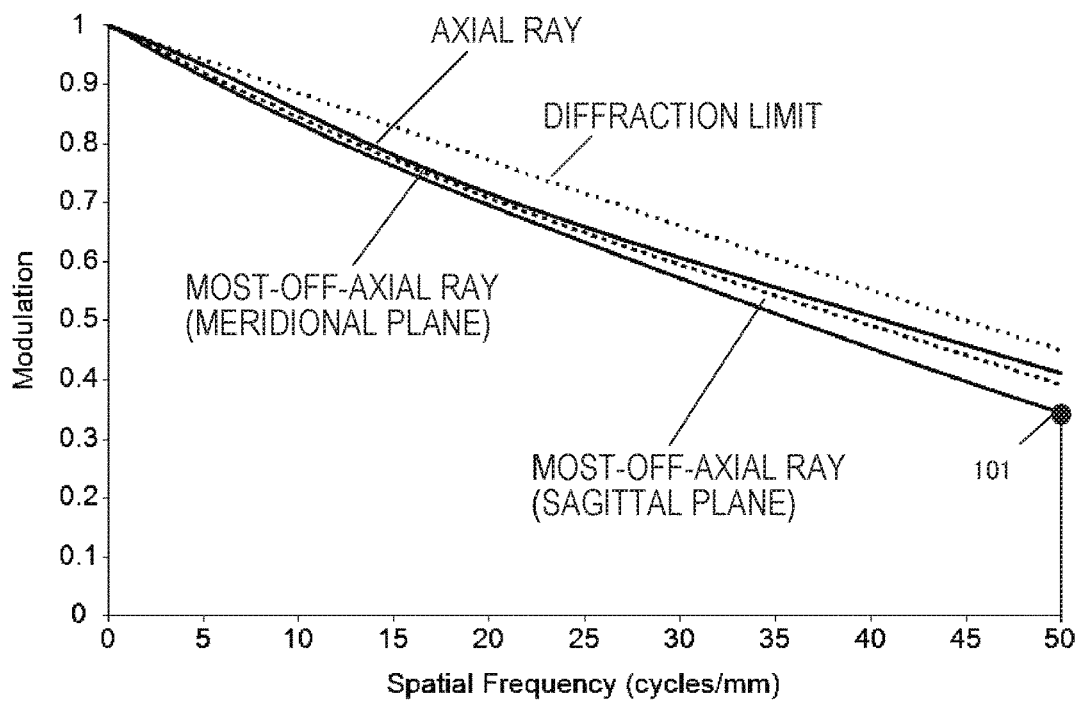
FIG. 20A is an MTF graph in Embodiment 10.
Figure 20B:
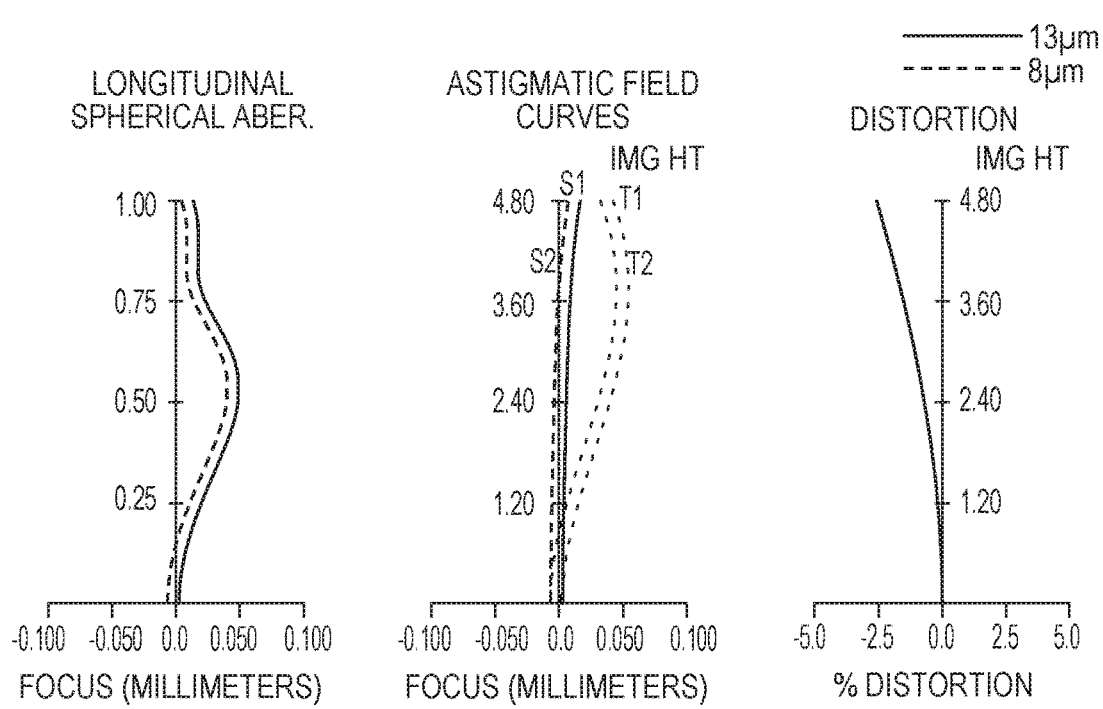
FIG. 20B is longitudinal aberration diagrams in Embodiment 10.

FIG. 19 is a lens cross-sectional view of an optical system according to Embodiment 10 of the present invention. FIG. 20A and FIG. 20B are an MTF graph and longitudinal aberration diagrams, respectively, in the optical system according to Embodiment 10.

Figure 21:
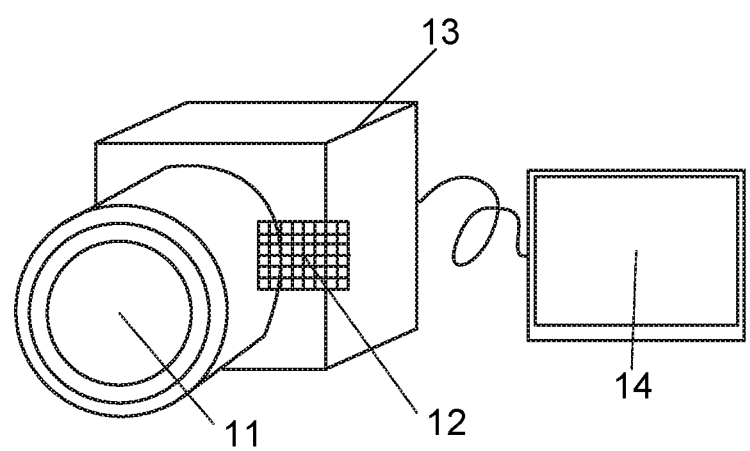
FIG. 21 is a schematic diagram of a main part of an image pickup apparatus according to one embodiment of the present invention.

FIG. 21 is a schematic diagram of a main part of the image pickup apparatus according to one embodiment of the present invention.

In the lens cross-sectional views, the left side is the object side (front side) and the right side is the image side (rear side). In the lens cross-sectional views, there are illustrated an optical system L0, first lenses L11, L21, L31, L41, L51, L61, L71, L81, L91, and L101, second lenses L12, L22, L32, L42, L52, L62, L72, L82, L92, and L102, third lenses L63, L73, L83, L93, and L103, a fourth lens L104, and aperture stops (stops) S1, S2, S3, S4, S5, S6, S7, S8, S9, and S10. There are also illustrated cover glasses CG1, CG2, CG3, CG4, CG5, CG6, CG7, CG8, CG9, and CG10, and infrared sensors (image pickup elements) IM1, IM2, IM3, IM4, IM5, IM6, IM7, IM8, IM9, and IM10.

In spherical aberration diagrams, the vertical axis represents a pupil position. The solid line represents a spherical aberration at a wavelength of 13 μm, and the dotted line represents a spherical aberration at a wavelength of 8 μm. In astigmatism diagrams, the vertical axis represents an image height. S1 represents a sagittal image plane at a wavelength of 13 μm, and T1 represents a meridional image plane at a wavelength of 13 μm. S2 represents a sagittal image plane at a wavelength of 8 μm, and T2 represents a meridional image plane at a wavelength of 8 μm. In distortion diagrams, the vertical axis represents an image height, and the distortion at a wavelength of 13 μm is shown.

Hitherto, in applications such as a monitoring camera and an in-vehicle camera, there has been demanded an infrared optical system having a small F-number, a small size as a whole, and a high resolution. As a material for an infrared ray, germanium (Ge) and silicon (Si) have a higher refractive index and a lower dispersion than those of other materials for an infrared ray, and hence, through use of germanium and silicon, it is possible to easily form an infrared optical system having a high resolution with a small number of lenses.

In the infrared optical system, as in the case of an optical system for a visible wavelength range, it is difficult to achieve high imaging performance unless various aberrations such as a chromatic aberration, a spherical aberration, and a curvature of field among other various aberrations are satisfactorily corrected. In order to achieve high imaging performance in the infrared optical system, it is important to appropriately set a lens configuration such as the number of lenses, a material of a lens, and a refractive power arrangement.

An optical system according to one embodiment of the present invention includes, in order from an object side to an image side, a first lens having a positive refractive power and having a meniscus shape with a convex surface facing the object side, and a second lens having a positive refractive power and having a meniscus shape with a convex surface facing the object side. The first lens is made of a silicon material, and the second lens is made of one of a silicon material and a germanium material.

As another configuration, the optical system according to one embodiment of the present invention consists of the first lens and the second lens, and the second lens is made of a germanium material.

As still another configuration, the optical system according to one embodiment of the present invention consists of, in order from the object side to the image side, the first lens, the second lens, and a third lens having a positive refractive power and having a convex surface facing the object side. The third lens is made of one of a silicon material and a germanium material.

As yet another configuration, the optical system according to one embodiment of the present invention consists of, in order from the object side to the image side, the first lens, the second lens, a third lens having a positive refractive power and having a convex surface facing the object side, and a fourth lens having a positive refractive power and having a convex surface facing the object side. The fourth lens is made of one of a silicon material and a germanium material.

Silicon or germanium used in each Embodiment may contain a few impurities.

The infrared optical system L0 according to one embodiment of the present invention has the following configuration in order to achieve satisfactory imaging performance.

The infrared optical system L0 includes, in order from an object side to an image side, a first lens having a positive refractive power and having a meniscus shape with a convex surface facing the object side, and a second lens having a positive refractive power and having a meniscus shape with a convex surface facing the object side. The first lens is made of a silicon material, and the second lens is made of one of a silicon material and a germanium material. The following conditional expression is satisfied:

$$0.90 < D/f < 2.00, \quad (1)$$

where f represents a focal length of the optical system, and D represents a distance on an optical axis between the first lens and the second lens.

Conditional Expression (1) is given in order to satisfactorily correct, in each Embodiment, various aberrations such as a chromatic aberration, a spherical aberration, and a curvature of field while maintaining a small lens thickness of the first lens made of silicon, to thereby obtain an infrared optical system having high optical performance. When the ratio exceeds or falls below the upper or lower limit value of Conditional Expression (1), the balance between correction of the curvature of field and correction of the spherical aberration is lost, and thus optical performance is deteriorated.

It is more preferred to set the numerical range of Conditional Expression (1) as follows.

$$0.90 < D/f < 1.65 \quad (1a)$$

Further, in the infrared optical system according to each Embodiment, the first lens is formed of a positive lens having a meniscus shape with a convex surface facing the object side, and the second lens is formed of a positive lens having a meniscus shape with a convex surface facing the object side. When the second lens is formed of a positive lens having a meniscus shape with a concave surface facing the object side, it is difficult to correct astigmatism due to an action exerted by the concave surface. In each Embodiment, the first lens and the second lens are configured in the above-mentioned manner. With this configuration, it is possible to easily obtain an infrared optical system having a small F-number and a high resolution.

A lens configuration in each Embodiment is described. A general image pickup lens has such a lens configuration as to satisfy Expression (1X) in order to correct a chromatic aberration. In Expression (1X), f1 represents a focal length of the first lens, f2 represents a focal length of the second lens, "fi" represents a focal length of an i-th lens, v1 represents a dispersion value (Abbe number) of a material of the first lens, v2 represents a dispersion value of a material of the second lens, and vi represents a dispersion value of a material of the i-th lens.

In general, a dispersion value of a material of a lens takes a positive value, and hence, in order to reduce the chromatic aberration, it is preferred that the focal length of one of the lenses be set negative. Accordingly, in many cases, a lens configuration for correcting a chromatic aberration is a lens configuration that uses a combination of a positive lens and a negative lens.

$$\frac{1}{f1v1} + \frac{1}{f2v2} \wedge + \frac{1}{fivi} = 0 \quad (1X)$$

Further, in order to correct a curvature of field, a lens configuration that satisfies Expression (2X) to reduce a Petzval sum is required. The Petzval sum is correlated with the curvature of field, and hence the curvature of field can be reduced by reducing the Petzval sum.

In Expression (2X), f1 represents the focal length of the first lens, f2 represents the focal length of the second lens, "fi" represents the focal length of the i-th lens, n1 represents a refractive index of the material of the first lens, n2 represents a refractive index of the material of the second lens, and "ni" represents a refractive index of the material of the i-th lens.

In general, a refractive index of a material of a lens takes a positive value, and hence, in order to reduce the Petzval sum, it is preferred that the focal length of one of the lenses be set negative. Accordingly, in many cases, a lens configuration for correcting the curvature of field is a lens configuration that uses a combination of a positive lens and a negative lens.

$$\frac{1}{f1n1} + \frac{1}{f2n2} \wedge + \frac{1}{fini} = 0 \quad (2X)$$

However, when the refractive indices n1, n2, and "ni" of the respective materials of the lenses are extremely large and the dispersion values v1, v2, and vi of the respective materials of the lenses are also extremely large, it is not necessarily required to use a combination of a positive lens and a negative lens in some cases.

In Table 21, there are shown a refractive index N10 and a dispersion value v10 of each representative material that transmits an infrared ray. In Table 21, the refractive index N10 represents a refractive index at a wavelength of 10 μm, and the dispersion value v10 represents a numerical value defined by Expression (3X) to be given later.

In general, a larger dispersion value means a smaller variation of a refractive index (smaller dispersion) depending on a wavelength. In Expression (3X), N8 represents a refractive index at a wavelength of 8 μm, and N12 represents a refractive index at a wavelength of 12 μm. Each numerical value slightly differs depending on a manufacturer of a glass material, and hence an approximate value is shown. As shown in Table 21, for an infrared ray, zinc selenide (ZnSe) and zinc sulfide (ZnS) each have a refractive index of about 2 and a dispersion value of from about 20 to about 60. Chalcogenide has a refractive index of about 2.5 and a dispersion value of 109.

Chalcogenide given above has a lower dispersion than those of zinc selenide (ZnSe) and zinc sulfide (ZnS). However, when chalcogenide is selected as a material of the first lens, a chromatic aberration is generated greatly, and hence it is difficult to obtain satisfactory imaging performance.

In order to correct a chromatic aberration and a curvature of field, a combination of a positive lens and a negative lens is used in general. However, germanium (Ge) and silicon (Si) have an extremely large (high) refractive index and have an extremely small dispersion. As a result, as apparent from Expression (1X) and Expression (2X), the chromatic aberration and the Petzval sum are made small in each of the first lens and the second lens through use of germanium and silicon.

In other words, when germanium (Ge) and silicon (Si) are used, it is not necessarily required to use a combination of a positive lens and a negative lens in order to correct a chromatic aberration and a curvature of field, and hence satisfactory imaging performance can be achieved with a small number of lenses. In addition, germanium (Ge) and silicon (Si) have a less negative effect on a human body, and thus have a less negative effect on a human body and environments even when a lens made of germanium or silicon is broken.

$$v10 = \frac{N10 - 1}{N8 - N12} \quad (3X)$$

In an infrared camera, in order to obtain heat information with high accuracy, an F-number of its infrared optical system is set to be 1.5 or less in many cases. In order to achieve satisfactory imaging performance with an infrared optical system having a small F-number, it is important to correct a spherical aberration, which is proportional to a pupil diameter of a lens. As a result, correction of spherical aberration amounts by separate lenses is effective, and hence, when germanium (Ge) and silicon (Si) are used as materials of the infrared optical system, a combination of a positive lens and a positive lens is preferred.

Further, in addition to the above-mentioned aberration correction action, with the configuration in which the first lens has a meniscus shape and the second lens has a meniscus shape, the infrared optical system is obtained in which various aberrations are suitably corrected while a high transmittance is ensured. With the configuration in which a light flux is caused to gently converge with refractive surfaces of the first lens and the second lens having the meniscus shapes, a generation amount of the spherical aberration is suppressed, and the lens thickness of the first lens made of silicon (Si) is reduced. As a result, decrease in transmittance due to silicon is alleviated.

In the optical system according to each Embodiment, it is more preferred to satisfy at least one of the following conditional expressions. The focal length of the first lens is represented by f1, and the focal length of the second lens is represented by f2. A lens thickness of the first lens is represented by t1. When the optical system according to one embodiment of the present invention further includes a third lens having a positive refractive power on the image side of the second lens and at a position adjacent to the second lens, a focal length of the third lens is represented by D. At this time, it is preferred to satisfy at least one of the following conditional expressions.

$$0.1 < f2/f1 < 3.0 \quad (2)$$

$$1.0 < f1/f < 6.0 \quad (3)$$

$$0.5 < f2/f < 6.0 \quad (4)$$

$$0.001 < t1/f1 < 0.065 \quad (5)$$

$$0.1 < f3/f2 < 2.0 \quad (6)$$

$$0.1 < f3/f < 3.0 \quad (7)$$

Next, a technical meaning of each of the conditional expressions given above is described. Conditional Expressions (2) to (4) are given in order to appropriately set the balance between the refractive powers of the first lens and the second lens to mainly reduce generation of a curvature of field. When the respective ratios do not fall within the numerical ranges of Conditional Expressions (2) to (4), the curvature of field is corrected insufficiently or excessively, and hence imaging performance is disadvantageously deteriorated. Conditional Expression (5) relates to a ratio of the thickness of the first lens having a large lens aperture diameter to the focal length of the first lens.

Conditional Expression (5) is given in order to cause a light flux to gently converge with the first lens and the second lens to suppress a generation amount of the spherical aberration and suppress the lens thickness of the first lens made of silicon (Si) to secure a high transmittance. When the ratio does not fall within the numerical range of Conditional Expression (5), the transmittance is disadvantageously reduced due to the thickness of the lens while the spherical aberration is corrected.

Conditional Expressions (6) and (7) are given in order to reduce an amount of aberrations generated from each lens while appropriately setting the balance between the refractive powers of the second lens and the third lens obtained when the optical system is formed of three or more lenses in total. When the respective ratios do not fall within the numerical ranges of Conditional Expressions (6) and (7), it is difficult to cause a light flux to gently converge with the first lens, the second lens, and the third lens, and hence an amount of aberrations generated from each lens disadvantageously increases. In particular, when the respective ratios do not fall within the numerical ranges of Conditional Expressions (6) and (7), a spherical aberration is generated greatly from each lens, and hence imaging performance is disadvantageously deteriorated. It is more preferred to set the numerical ranges of Conditional Expressions (2) to (7) as follows.

$$0.2 < f2/f1 < 1.5 \quad (2a)$$

$$1.5 < f1/f < 5.0 \quad (3a)$$

$$0.7 < f2/f < 4.0 \quad (4a)$$

$$0.01 < t1/f1 < 0.05 \quad (5a)$$

$$0.15 < f3/f2 < 1.00 \quad (6a)$$

$$0.5 < f3/f < 2.5 \quad (7a)$$

Through reduction of the F-number, it is difficult to correct a high-order spherical aberration and the curvature of field with a small number of lenses. It is therefore preferred to adopt at least one aspherical shape for each of the lens shapes.

Next, a lens configuration of the infrared optical system L0 according to each Embodiment is described.

Embodiment 1

FIG. 1 is a lens cross-sectional view of the optical system L0 according to Embodiment 1. The optical system according to Embodiment 1 has a focal length of 25 mm and an F-number of 1.0. The optical system L0 according to Embodiment 1 includes, in order from the object side to the image side, the first lens L11 having a positive refractive power and made of a silicon (Si) material, the aperture stop S1, and the second lens L12 having a positive refractive power and made of a germanium (Ge) material. In the following, in every Embodiment, a germanium or silicon material may be a single crystalline material or a polycrystalline material. Further, silicon or germanium used in each Embodiment may contain a few impurities.

A light flux having an infrared wavelength range (8 μm to 13 μm) emitted from an object and guided by the optical system L0 passes through the cover glass CG1 to form an image on the infrared sensor IM1. Even when a cover glass is arranged between the first lens L11 and the object or even when a material of the cover glass CG1 for the infrared sensor IM1 is a material for an infrared ray other than germanium (Ge), the effects of Embodiment 1 are obtained. Numerical data on the optical system according to Embodiment 1 is shown in Table 1. In Table 1, the units of a radius of curvature and an interval of each optical surface are in millimeters.

In Table 2, aspherical shape data on an aspherical surface of the optical system L0 according to Embodiment 1 is shown. An aspherical shape is represented by Expression (4X) to be given below.

FIG. 2A is an MTF graph in Embodiment 1. A general infrared sensor has a pixel pitch of several tens of micrometers. When it is assumed as an example that an infrared sensor having a pixel pitch of 17 μm is used, a Nyquist frequency is about 30 lp/mm. In order to resolve an object at the Nyquist frequency, an MTF value that is equal to or larger than 30% is empirically preferred. A point 11 of FIG. 2A indicates an MTF value at a frequency of 30 lp/mm in Embodiment 1, and a value thereof is 44%. The MTF value is equal to or larger than 30% at the Nyquist frequency of the infrared sensor IM1, and hence it can be understood that imaging performance is satisfactory.

In FIG. 2B, longitudinal aberrations in Embodiment 1 are shown. As shown in FIG. 2B, it can be understood that a spherical aberration, a curvature of field, and a chromatic aberration are satisfactorily corrected.

It has been described that, from the optical conditions, the infrared optical system preferably uses a combination of a positive lens and a positive lens made of a germanium (Ge) material and a silicon (Si) material, respectively. Germanium (Ge) is a rare metal. Meanwhile, silicon (Si) is easily available. Further, from the viewpoint of transmittance, in silicon (Si), decrease of transmittance with increase in thickness is large due to a chemical factor. It therefore tends to be difficult to manufacture a lens configuration using a combination of a positive lens and a positive lens that use only germanium (Ge) as their materials.

Meanwhile, a combination of a positive lens and a positive lens that use only silicon (Si) requires a predetermined thickness in order to correct a spherical aberration, and hence the transmittance is reduced. Moreover, the aperture diameter of the lens is smaller on the image side than on the object side. It is therefore preferred that silicon (Si) and germanium (Ge) be used as the materials of the first lens and the second lens, respectively.

The optical system L0 according to Embodiment 1 described above includes the first lens having a positive refractive power and made of silicon (Si) and the second lens having a positive refractive power and made of germanium (Ge). With this, the infrared optical system L0 is achieved in which a suitable balance between imaging performance and transmittance, for example, is achieved.

Embodiment 2

FIG. 3 is a lens cross-sectional view of the optical system L0 according to Embodiment 2. The optical system according to Embodiment 2 has a focal length of 25 mm and an F-number of 1.0. The optical system L0 according to Embodiment 2 includes, in order from the object side to the image side, the aperture stop S2, the first lens L21 having a positive refractive power and made of a silicon (Si) material, and the second lens L22 having a positive refractive power and made of a germanium (Ge) material.

With the configuration in which the aperture stop S2 is arranged on the object side, an outer diameter of each lens is reduced, and hence the entire optical system is further downsized. A light flux having an infrared wavelength range (8 μm to 13 μm) emitted from an object and guided by the optical system L0 passes through the cover glass CG2 to form an image on the infrared sensor IM2. Numerical data on the optical system L0 according to Embodiment 2 is shown in Table 3. In Table 3, the units of a radius of curvature and an interval of each optical surface are in millimeters. In Table 4, aspherical shape data on an aspherical surface of the optical system L0 according to Embodiment 2 is shown. An aspherical shape is represented by Expression (4X) as in Embodiment 1.

FIG. 4A is an MTF graph in Embodiment 2. A point 21 of FIG. 4A indicates an MTF value at a frequency of 30 lp/mm in Embodiment 2, and a value thereof is 45%. The MTF value is equal to or larger than 30% at the Nyquist frequency of the infrared sensor IM2, and hence it can be understood that imaging performance is satisfactory. In FIG. 4B, longitudinal aberrations in Embodiment 2 are shown. As shown in FIG. 4B, it can be understood that a spherical aberration, a curvature of field, and a chromatic aberration are satisfactorily corrected. As described above, in the optical system L0 according to Embodiment 2, the aperture stop may be arranged at any position in the optical axis direction.

Embodiment 3

FIG. 5 is a lens cross-sectional view of the optical system L0 according to Embodiment 3. The optical system according to Embodiment 3 has a focal length of 25 mm and an F-number of 1.0. The optical system L0 according to Embodiment 3 includes, in order from the object side to the image side, the first lens L31 having a positive refractive power and made of a silicon (Si) material, the aperture stop S3, and the second lens L32 having a positive refractive power and made of a germanium (Ge) material.

In Embodiment 3, a back focus is shorter than that in Embodiment 1. A light flux having a far infrared wavelength range (8 μm to 13 μm) emitted from an object and guided by the optical system L0 passes through the cover glass CG3 to form an image on the infrared sensor IM3. Numerical data on the optical system L0 according to Embodiment 3 is shown in Table 5. In Table 5, the units of a radius of curvature and an interval of each optical surface are in millimeters. In Table 6, aspherical shape data on an aspherical surface of the optical system L0 according to Embodiment 3 is shown. An aspherical shape is represented by Expression (4X) as in Embodiment 1.

FIG. 6A is an MTF graph in Embodiment 3. A point 31 of FIG. 6A indicates an MTF value at a frequency of 30 lp/mm in Embodiment 3, and a value thereof is 53%. The MTF value is equal to or larger than 30% at the Nyquist frequency of the infrared sensor IM3, and hence it can be understood that imaging performance is satisfactory. In FIG. 6B, longitudinal aberrations in Embodiment 3 are shown. As shown in FIG. 6B, it can be understood that a spherical aberration, a curvature of field, and a chromatic aberration are satisfactorily corrected.

Embodiment 4

FIG. 7 is a lens cross-sectional view of the optical system L0 according to Embodiment 4. The optical system according to Embodiment 4 has a focal length of 40 mm and an F-number of 1.0. The optical system L0 according to Embodiment 4 includes, in order from the object side to the image side, the first lens L41 having a positive refractive power and made of a silicon (Si) material, the aperture stop S4, and the second lens L42 having a positive refractive power and made of a germanium (Ge) material.

A light flux having an infrared wavelength range (8 μm to 13 μm) emitted from an object and guided by the optical system L0 passes through the cover glass CG4 to form an image on the infrared sensor IM4. Numerical data on the optical system L0 according to Embodiment 4 is shown in Table 7. In Table 7, the units of a radius of curvature and an interval of each optical surface are in millimeters. In Table 8, aspherical shape data on an aspherical surface of the optical system L0 according to Embodiment 4 is shown. An aspherical shape is represented by Expression (4X) as in Embodiment 1.

FIG. 8A is an MTF graph in Embodiment 4. A point 41 of FIG. 8A indicates an MTF value at a frequency of 30 lp/mm in Embodiment 4, and a value thereof is 52%. The MTF value is equal to or larger than 30% at the Nyquist frequency of the infrared sensor IM4, and hence it can be understood that imaging performance is satisfactory. In FIG. 8B, longitudinal aberrations in Embodiment 4 are shown. As shown in FIG. 8B, it can be understood that a spherical aberration, a curvature of field, and a chromatic aberration are satisfactorily corrected. The optical system L0 according to Embodiment 4 has a telephoto focal length compared with Embodiment 1.

Embodiment 5

FIG. 9 is a lens cross-sectional view of the optical system L0 according to Embodiment 5. The optical system according to Embodiment 5 has a focal length of 20 mm and an F-number of 1.0. The optical system L0 according to Embodiment 5 includes, in order from the object side to the image side, the first lens L51 having a positive refractive power and made of a silicon (Si) material, the aperture stop S5, and the second lens L52 having a positive refractive power and made of a germanium (Ge) material.

In Embodiment 5, the focal length is set so that a wider angle of view is obtained compared with that in Embodiment 1. A light flux having an infrared wavelength range (8 μm to 13 μm) emitted from an object and guided by the optical system L0 passes through the cover glass CG5 to form an image on the infrared sensor IM5. Numerical data on the optical system L0 according to Embodiment 5 is shown in Table 9. In Table 9, the units of a radius of curvature and an interval of each optical surface are in millimeters. In Table 10, aspherical shape data on an aspherical surface of the optical system L0 according to Embodiment 5 is shown. An aspherical shape is represented by Expression (4X) as in Embodiment 1.

FIG. 10A is an MTF graph in Embodiment 5. A point 51 of FIG. 10A indicates an MTF value at a frequency of 30 lp/mm in Embodiment 5, and a value thereof is 43%. The MTF value is equal to or larger than 30% at the Nyquist frequency of the infrared sensor IM5, and hence it can be understood that imaging performance is satisfactory. In FIG. 10B, longitudinal aberrations in Embodiment 5 are shown. As shown in FIG. 10B, it can be understood that a spherical aberration, a curvature of field, and a chromatic aberration are satisfactorily corrected.

Embodiment 6

FIG. 11 is a lens cross-sectional view of the optical system L0 according to Embodiment 6 of the present invention. The optical system according to Embodiment 6 has a focal length of 8 mm and an F-number of 0.8.

The optical system L0 according to Embodiment 6 consists of, in order from the object side to the image side, the following lenses: the first lens L61 having a positive refractive power and made of a silicon (Si) material, the aperture stop S6, the second lens L62 having a positive refractive power and made of a germanium (Ge) material, and the third lens L63 having a positive refractive power and made of a silicon material. Each of the first lens L61 to the third lens L63 has a meniscus shape with a convex surface facing the object side.

A light flux having an infrared wavelength range (8 μm to 13 μm) emitted from an object and guided by the optical system L0 passes through the cover glass CG6 to form an image on the infrared sensor IM6. Even when a cover glass is arranged between the first lens L61 and the object or even when a material of the cover glass CG6 for the infrared sensor IM6 is a material for an infrared ray other than germanium (Ge), the effects of Embodiment 6 are obtained.

Numerical data on the optical system L0 according to Embodiment 6 is shown in Table 11. In Table 11, the units of a radius of curvature and an interval of each optical surface are in millimeters. In Table 12, aspherical shape data on an aspherical surface of the optical system L0 according to Embodiment 6 is shown. An aspherical shape is represented by Expression (4X) as in Embodiment 1.

FIG. 12A is an MTF graph in Embodiment 6. A general infrared sensor has a pixel pitch of several tens of micrometers. When it is assumed as an example that an infrared sensor having a pixel pitch of 12 μm is used, a Nyquist frequency is about 42 lp/mm. In order to resolve an object at the Nyquist frequency, an MTF value that is equal to or larger than 30% is empirically preferred. A point 61 of FIG. 12A indicates an MTF value at a frequency of 42 lp/mm in Embodiment 6, and a value thereof is 38%. The MTF value is equal to or larger than 30% at the Nyquist frequency of the infrared sensor IM6, and hence it can be understood that imaging performance is satisfactory.

In FIG. 12B, longitudinal aberrations in Embodiment 6 are shown. As shown in FIG. 12B, it can be understood that a spherical aberration, a curvature of field, and a chromatic aberration are satisfactorily corrected.

In Embodiment 6, germanium (Ge) is used as the material of the second lens L62 having a large lens thickness, and silicon (Si) is used as the material of the first lens L61 having a larger lens diameter (effective diameter) but having a lens thickness that can be made small. Further, the third lens L63 having a small lens thickness and a small lens diameter is made of silicon (Si). With this configuration, satisfactory optical performance is obtained while a high transmittance is secured.

Embodiment 7

FIG. 13 is a lens cross-sectional view of the optical system L0 according to Embodiment 7 of the present invention. The optical system according to Embodiment 7 has a focal length of 18 mm and an F-number of 0.8.

The optical system L0 according to Embodiment 7 consists of, in order from the object side to the image side, the following lenses: the first lens L71 having a positive refractive power and made of a silicon (Si) material, the aperture stop S7, the second lens L72 having a positive refractive power and made of a germanium (Ge) material, and the third lens L73 having a positive refractive power and made of a germanium (Ge) material. Each of the first lens L71 to the third lens L73 has a convex surface facing the object side.

A light flux having an infrared wavelength range (8 μm to 13 μm) emitted from an object and guided by the optical system L0 passes through the cover glass CG7 to form an image on the infrared sensor IM7. Numerical data on the optical system L0 according to Embodiment 7 is shown in Table 13. In Table 13, the units of a radius of curvature and an interval of each optical surface are in millimeters. In Table 14, aspherical shape data on an aspherical surface of the optical system L0 according to Embodiment 7 is shown. An aspherical shape is represented by Expression (4X) as in Embodiment 6.

FIG. 14A is an MTF graph in Embodiment 7. A point 71 of FIG. 14A indicates an MTF value at a frequency of 42 lp/mm in Embodiment 7, and a value thereof is 39%. The MTF value is equal to or larger than 30% at the Nyquist frequency of the infrared sensor IM7, and hence it can be understood that imaging performance is satisfactory. In FIG. 14B, longitudinal aberrations in Embodiment 7 are shown. As shown in FIG. 14B, it can be understood that a spherical aberration, a curvature of field, and a chromatic aberration are satisfactorily corrected. As described above, in the optical system L0 according to one embodiment of the present invention, the aperture stop may be arranged at any position.

Embodiment 8

FIG. 15 is a lens cross-sectional view of the optical system L0 according to Embodiment 8 of the present invention. The optical system according to Embodiment 8 has a focal length of 18 mm and an F-number of 0.8.

The optical system L0 according to Embodiment 8 consists of, in order from the object side to the image side, the following lenses: the first lens L81 having a positive refractive power and made of a silicon (Si) material, the aperture stop S8, the second lens L82 having a positive refractive power and made of a silicon (Si) material, and the third lens L83 having a positive refractive power and made of a silicon (Si) material. Each of the first lens L81 to the third lens L83 has a convex surface facing the object side.

A light flux having a far infrared wavelength range (8 μm to 13 μm) emitted from an object and guided by the optical system L0 passes through the cover glass CG8 to form an image on the infrared sensor IM8. Numerical data on the optical system L0 according to Embodiment 8 is shown in Table 15. In Table 15, the units of a radius of curvature and an interval of each optical surface are in millimeters. In Table 16, aspherical shape data on an aspherical surface of the optical system L0 according to Embodiment 8 is shown. An aspherical shape is represented by Expression (4X) as in Embodiment 1.

FIG. 16A is an MTF graph in Embodiment 8. A point 81 of FIG. 16A indicates an MTF value at a frequency of 42 lp/mm in Embodiment 8, and a value thereof is 40%. The MTF value is equal to or larger than 30% at the Nyquist frequency of the infrared sensor IM8, and hence it can be understood that imaging performance is satisfactory. In FIG. 16B, longitudinal aberrations in Embodiment 8 are shown. As shown in FIG. 16B, it can be understood that a spherical aberration, a curvature of field, and a chromatic aberration are satisfactorily corrected.

Embodiment 9

FIG. 17 is a lens cross-sectional view of the optical system L0 according to Embodiment 9 of the present invention. The optical system according to Embodiment 9 has a focal length of 18 mm and an F-number of 0.8.

The optical system L0 according to Embodiment 9 consists of, in order from the object side to the image side, the following lenses: the first lens L91 having a positive refractive power and made of a silicon (Si) material, the aperture stop S9, the second lens L92 having a positive refractive power and made of a silicon (Si) material, and the third lens L93 having a positive refractive power and made of a germanium (Ge) material. Each of the first lens L91 to the third lens L93 has a convex surface facing the object side.

A light flux having an infrared wavelength range (8 μm to 13 μm) emitted from an object and guided by the optical system L0 passes through the cover glass CG9 to form an image on the infrared sensor IM9. Numerical data on the optical system L0 according to Embodiment 9 is shown in Table 17. In Table 17, the units of a radius of curvature and an interval of each optical surface are in millimeters. In Table 18, aspherical shape data on an aspherical surface of the optical system L0 according to Embodiment 9 is shown. An aspherical shape is represented by Expression (4X) as in Embodiment 6.

FIG. 18A is an MTF graph in Embodiment 9. A point 91 of FIG. 18A indicates an MTF value at a frequency of 42 lp/mm in Embodiment 9, and a value thereof is 36%. The MTF value is equal to or larger than 30% at the Nyquist frequency of the infrared sensor IM9, and hence it can be understood that imaging performance is satisfactory. In FIG. 18B, longitudinal aberrations in Embodiment 9 are shown. As shown in FIG. 18B, it can be understood that a spherical aberration, a curvature of field, and a chromatic aberration are satisfactorily corrected.

Embodiment 10

FIG. 19 is a lens cross-sectional view of the optical system L0 according to Embodiment 10 of the present invention. The optical system according to Embodiment 10 has a focal length of 18 mm and an F-number of 0.8.

The optical system L0 according to Embodiment 10 consists of, in order from the object side to the image side, the following lenses: the first lens L101 having a positive refractive power and made of a silicon (Si) material, the aperture stop S10, the second lens L102 having a positive refractive power and made of a germanium (Ge) material, the third lens L103 having a positive refractive power and made of a silicon (Si) material, and the fourth lens L104 having a positive refractive power and made of a silicon (Si) material. Each of the first lens L101 to the fourth lens L104 has a convex surface facing the object side.

A light flux having an infrared wavelength range (8 μm to 13 μm) emitted from an object and guided by the optical system L0 passes through the cover glass CG10 to form an image on the infrared sensor IM10. Numerical data on the optical system L0 according to Embodiment 10 is shown in Table 19. In Table 19, the units of a radius of curvature and an interval of each optical surface are in millimeters. In Table 20, aspherical shape data on an aspherical surface of the optical system L0 according to Embodiment 10 is shown. An aspherical shape is represented by Expression (4X) as in Embodiment 1.

FIG. 20A is an MTF graph in Embodiment 10. A point 101 of FIG. 20A indicates an MTF value at a frequency of 50 lp/mm in Embodiment 10, and a value thereof is 34%. When it is assumed that the infrared sensor IM10 is a sensor having a pitch of 10 μm, the MTF value is equal to or larger than 30% at the Nyquist frequency of the infrared sensor IM10, and hence it can be understood that imaging performance is satisfactory. In FIG. 20B, longitudinal aberrations in Embodiment 10 are shown. As shown in FIG. 20B, it can be understood that a spherical aberration, a curvature of field, and a chromatic aberration are satisfactorily corrected. As described above, the effects of the present invention are effective irrespective of the number of lenses.

In table 22 described below, the focal length of the fourth lens L104 is described as f4.

Next, an infrared camcoder (video camera) (image pickup apparatus) using the optical system according to each Embodiment according to one embodiment of the present invention is described with reference to FIG. 21. In FIG. 21, the image pickup apparatus includes a camera main body 13 and an image pickup optical system 11, which is formed of any one of the optical systems described in Embodiments 1 to 10. The image pickup apparatus further includes an image pickup element (infrared sensor) 12, for example, a microbolometer. The image pickup element 12 is built into the camera main body 13, and is configured to receive (photoelectrically convert) an object image formed by the image pickup optical system 11. As the infrared sensor, an infrared sensor formed through use of, for example, vanadium oxide or amorphous silicon is adopted. This image pickup apparatus is applicable to a monitoring camera, an in-vehicle camera, and other such cameras.

Now, specific numerical data on each lens in Embodiments 1 to 10 are shown in Table 1 to Table 20. In each piece of numerical data, a surface number "i" represents an order counted from the object side, symbol "ri" represents a radius of curvature of the i-th optical surface (i-th surface or aperture stop), and symbol "di" represents an interval on the optical axis between the i-th surface and the (i+1)-th surface. A material of each optical member is also shown. An aspherical shape is expressed by Expression (4X):

$$z = \frac{(1/R)h^2}{1 + \sqrt{1 - (1+k)(1/R)^2 h^2}} + Ah^4 + Bh^6 + Ch^8 + Dh^{10} + Eh^{12} + Fh^{14} + Gh^{16} \quad (4X)$$

where the X axis corresponds to an optical axis direction, the H axis corresponds to a direction perpendicular to the optical axis, a light traveling direction is positive, R represents a paraxial radius of curvature, "k" represents a conic constant, and A, B, C, D, E, F, and G each represent an aspherical coefficient. The notation "e-x" means "10-x". Further, a relationship between a value of each of the parameters relating to the conditional expressions given above and numerical data is shown in Table 22.

TABLE 1

| Surface number | Object surface | | Radius of curvature r | Interval d Infinite | Glass material |
|---|---|---|---|---|---|
| 1 | L11 | Aspherical surface 11 | 39.62 | 2.00 | Silicon |
| 2 | | | 52.09 | 16.74 | |
| 3 | Stop | | Flat | 14.33 | |
| 4 | L12 | Aspherical surface 12 | 22.78 | 9.04 | Germanium |
| 5 | | Aspherical surface 13 | 23.32 | 1.88 | |
| 6 | CG1 | | Flat | 1.00 | Germanium |
| 7 | | | Flat | 5.00 | |
| | Image plane | | Flat | | |

TABLE 2

| | Aspherical surface 11 | Aspherical surface 12 | Aspherical surface 13 |
|---|---|---|---|
| Paraxial radius of curvature R | 39.62 | 22.78 | 23.32 |
| Conic constant k | 0 | 0 | 0 |
| Fourth-order coefficient A | −1.0E−06 | 1.4E−05 | 6.2E−05 |
| Sixth-order coefficient B | 5.6E−09 | 2.0E−08 | 9.5E−08 |
| Eighth-order coefficient C | −5.9E−11 | −4.2E−10 | −6.2E−09 |
| Tenth-order coefficient D | 2.6E−13 | 6.7E−12 | 2.6E−10 |
| Twelfth-order coefficient E | −6.0E−16 | −4.2E−14 | −3.9E−12 |
| Fourteenth-order coefficient F | 5.2E−19 | 1.1E−16 | 2.4E−14 |

TABLE 3

| Surface number | Object surface | | Radius of curvature | Interval Infinite | Glass material |
|---|---|---|---|---|---|
| 1 | Stop | | | 0.1 | |
| 2 | L21 | Aspherical surface 21 | 23.09 | 2.0 | Silicon |
| 3 | | Aspherical surface 22 | 27.39 | 23.6 | |
| 4 | L22 | Aspherical surface 23 | 22.61 | 6.8 | Germanium |
| 5 | | Aspherical surface 24 | 23.04 | 2.0 | |
| 6 | CG2 | | Flat | 1.0 | Germanium |
| 7 | | | Flat | 5.0 | |
| | Image plane | | Flat | | |

TABLE 4

| | Aspherical surface 21 | Aspherical surface 22 | Aspherical surface 23 | Aspherical surface 24 |
|---|---|---|---|---|
| Paraxial radius of curvature R | 23.09 | 27.39 | 22.61 | 23.04 |
| Conic constant k | 0 | 0 | 0 | 0 |
| Fourth-order coefficient A | 8.4E−06 | 1.3E−05 | 1.9E−06 | 1.6E−05 |
| Sixth-order coefficient B | 2.0E−08 | −2.0E−08 | 3.1E−09 | 3.7E−07 |
| Eighth-order coefficient C | −9.0E−10 | −2.4E−10 | −2.1E−09 | −3.5E−08 |
| Tenth-order coefficient D | 1.9E−11 | 1.7E−11 | 4.9E−12 | 6.8E−10 |
| Twelfth-order coefficient E | −1.3E−13 | −1.6E−13 | 1.1E−13 | −7.4E−12 |
| Fourteenth-order coefficient F | 3.2E−16 | 4.5E−16 | −1.2E−15 | 3.1E−14 |

TABLE 5

| Surface number | Object surface | | Radius of curvature | Interval Infinite | Glass material |
|---|---|---|---|---|---|
| 1 | L31 | Aspherical surface 31 | 33.59 | 2.0 | Silicon |
| 2 | | | 46.16 | 12.5 | |
| 3 | Stop | | Flat | 16.0 | |
| 4 | L32 | Aspherical surface 32 | 24.96 | 10.0 | Germanium |
| 5 | | Aspherical surface 33 | 24.35 | 1.3 | |
| 6 | CG3 | | Flat | 1.0 | Germanium |
| 7 | | | Flat | 3.0 | |
| | Image plane | | Flat | | |

TABLE 6

| | Aspherical surface 31 | Aspherical surface 32 | Aspherical surface 33 |
|---|---|---|---|
| Paraxial radius of curvature R | 33.59 | 24.96 | 24.35 |
| Conic constant k | 0 | 0 | 0 |
| Fourth-order coefficient A | −8.8E−07 | 7.4E−07 | 2.9E−05 |
| Sixth-order coefficient B | 9.1E−09 | 2.0E−07 | 4.4E−07 |
| Eighth-order coefficient C | −1.2E−10 | −3.9E−09 | 5.3E−10 |
| Tenth-order coefficient D | 7.4E−13 | 2.7E−11 | −4.4E−10 |
| Twelfth-order coefficient E | −2.2E−15 | −1.0E−13 | 4.3E−12 |
| Fourteenth-order coefficient F | 2.5E−18 | 2.2E−16 | 6.3E−15 |

TABLE 7

| Surface number | Object surface | | Radius of curvature | Interval Infinite | Glass material |
|---|---|---|---|---|---|
| 1 | L41 | Aspherical surface 41 | 88.89 | 2.0 | Silicon |
| 2 | | | 144.27 | 33.2 | |
| 3 | Stop | | Flat | 24.5 | |
| 4 | L42 | Aspherical surface 42 | 26.86 | 10.0 | Germanium |
| 5 | | Aspherical surface 43 | 26.74 | 4.2 | |
| 6 | CG4 | | Flat | 1.0 | Germanium |
| 7 | | | Flat | 5.0 | |
| | Image plane | | Flat | | |

TABLE 8

| | Aspherical surface 41 | Aspherical surface 42 | Aspherical surface 43 |
|---|---|---|---|
| Paraxial radius of curvature R | 88.89 | 26.86 | 26.74207 |
| Conic constant k | 0 | 0 | 0 |
| Fourth-order coefficient A | −1.7E−07 | 1.0E−05 | 4.64E−05 |
| Sixth-order coefficient B | 3.7E−10 | −4.3E−08 | −6.22E−07 |
| Eighth-order coefficient C | −1.8E−12 | 6.3E−10 | 1.49E−08 |
| Tenth-order coefficient D | 3.7E−15 | −3.5E−12 | −1.63E−10 |
| Twelfth-order coefficient E | −3.8E−18 | 1.1E−14 | 9.70E−13 |
| Fourteenth-order coefficient F | 1.5E−21 | −1.2E−17 | −2.10E−15 |

TABLE 9

| Surface number | Object surface | | Radius of curvature | Interval Infinite | Glass material |
|---|---|---|---|---|---|
| 1 | L51 | Aspherical surface 51 | 45.31 | 2.0 | Silicon |
| 2 | | | 56.12 | 14.3 | |
| 3 | Stop | | Flat | 13.2 | |
| 4 | L52 | Aspherical surface 52 | 24.33 | 12.5 | Germanium |

TABLE 9-continued

| Surface number | Object surface | | Radius of curvature | Interval Infinite | Glass material |
|---|---|---|---|---|---|
| 5 | | Aspherical surface 53 | 26.12 | 2.0 | |
| 6 | CG5 | | Flat | 1.0 | Germanium |
| 7 | | | Flat | 5.0 | |
| | Image plane | | Flat | | |

TABLE 10

| | Aspherical surface 51 | Aspherical surface 52 | Aspherical surface 53 |
|---|---|---|---|
| Paraxial radius of curvature R | 45.31 | 24.33 | 26.12 |
| Conic constant k | 0 | 0 | 0 |
| Fourth-order coefficient A | −2.3E−06 | 1.2E−05 | 7.0E−05 |
| Sixth-order coefficient B | 9.5E−09 | −7.8E−09 | 2.5E−07 |
| Eighth-order coefficient C | −1.3E−10 | 2.7E−10 | −9.2E−09 |
| Tenth-order coefficient D | 6.7E−13 | −1.4E−12 | 4.4E−10 |
| Twelfth-order coefficient E | −1.8E−15 | 5.4E−15 | −6.8E−12 |
| Fourteenth-order coefficient F | 1.7E−18 | −4.8E−18 | 4.3E−14 |

TABLE 11

| Surface number | Object surface | | Radius of curvature | Interval Infinite | Glass material |
|---|---|---|---|---|---|
| 1 | L61 | Aspherical surface 61 | 19.69 | 1.5 | Silicon |
| 2 | | | 21.71 | 11.5 | |
| 3 | Stop | | Flat | 6.6 | |
| 4 | L62 | Aspherical surface 62 | 13.73 | 4.7 | Germanium |
| 5 | | | 11.01 | 2.7 | |
| 6 | L63 | | 29.42 | 1.2 | Silicon |
| 7 | | | 113.25 | 2.8 | |
| 8 | CG6 | | Flat | 1 | Germanium |
| 9 | | | Flat | 3 | |
| | Image plane | | — | | |

TABLE 12

| | Aspherical surface 61 | Aspherical surface 62 |
|---|---|---|
| Paraxial radius of curvature R | 19.69 | 13.73 |
| Conic constant k | 0 | 0 |
| Fourth-order coefficient A | −2.1E−06 | −7.9E−06 |
| Sixth-order coefficient B | −1.7E−08 | −1.4E−08 |
| Eighth-order coefficient C | 2.6E−10 | −1.8E−10 |
| Tenth-order coefficient D | −3.5E−12 | −1.5E−12 |
| Twelfth-order coefficient E | 1.9E−14 | 6.0E−15 |
| Fourteenth-order coefficient F | −4.3E−17 | −5.4E−17 |

TABLE 13

| Surface number | Object surface | | Radius of curvature | Interval Infinite | Glass material |
|---|---|---|---|---|---|
| 1 | L71 | Aspherical surface 71 | 22.45 | 1.5 | Silicon |
| 2 | | | 24.76 | 14.4 | |
| 3 | Stop | | Flat | 6.0 | |
| 4 | L72 | Aspherical surface 72 | 17.99 | 7.5 | Germanium |
| 5 | | | 13.85 | 2.0 | |
| 6 | L73 | | 38.22 | 1.9 | Germanium |

TABLE 13-continued

| Surface number | Object surface | Radius of curvature | Interval Infinite | Glass material |
|---|---|---|---|---|
| 7 | | 202.84 | 2.6 | |
| 8 | CG7 | Flat | 1.0 | Germanium |
| 9 | | Flat | 3.0 | |
| | Image plane | — | | |

TABLE 14

| | Aspherical surface 71 | Aspherical surface 72 |
|---|---|---|
| Paraxial radius of curvature R | 22.45 | 17.99 |
| Conic constant k | 0 | 0 |
| Fourth-order coefficient A | −2.1E−06 | −5.5E−06 |
| Sixth-order coefficient B | −9.4E−09 | 2.2E−08 |
| Eighth-order coefficient C | 6.4E−11 | −6.9E−10 |
| Tenth-order coefficient D | −8.5E−13 | 8.3E−12 |
| Twelfth-order coefficient E | 3.8E−15 | −6.0E−14 |
| Fourteenth-order coefficient F | −8.3E−18 | 1.7E−16 |

TABLE 15

| Surface number | Object surface | | Radius of curvature | Interval Infinite | Glass material |
|---|---|---|---|---|---|
| 1 | L81 | Aspherical surface 81 | 18.78 | 1.5 | Silicon |
| 2 | | | 20.37 | 11.3 | |
| 3 | Stop | | Flat | 6.4 | |
| 4 | L82 | Aspherical surface 82 | 13.42 | 5.1 | Silicon |
| 5 | | | 10.74 | 2.7 | |
| 6 | L83 | | 27.37 | 1.2 | Silicon |
| 7 | | | 94.35 | 2.8 | |
| 8 | CG8 | | Flat | 1.0 | Germanium |
| 9 | | | Flat | 3.0 | |
| | Image plane | | — | | |

TABLE 16

| | Aspherical surface 81 | Aspherical surface 82 |
|---|---|---|
| Paraxial radius of curvature R | 18.78 | 13.42 |
| Conic constant k | 0 | 0 |
| Fourth-order coefficient A | −2.1E−06 | −1.0E−05 |
| Sixth-order coefficient B | −2.2E−08 | −1.1E−08 |
| Eighth-order coefficient C | 3.8E−10 | −6.7E−10 |
| Tenth-order coefficient D | −5.1E−12 | 5.8E−12 |
| Twelfth-order coefficient E | 2.8E−14 | −5.5E−14 |
| Fourteenth-order coefficient F | −6.3E−17 | 9.2E−17 |

TABLE 17

| Surface number | Object surface | | Radius of curvature | Interval Infinite | Glass material |
|---|---|---|---|---|---|
| 1 | L91 | Aspherical surface 91 | 19.14 | 1.5 | Silicon |
| 2 | | | 20.93 | 11.4 | |
| 3 | Stop | | 1.00E+18 | 6.5 | |
| 4 | L92 | Aspherical surface 92 | 13.45 | 4.8 | Silicon |
| 5 | | | 11.06 | 2.8 | |
| 6 | L93 | | 29.63 | 1.2 | Germanium |
| 7 | | | 74.44 | 2.9 | |
| 8 | CG9 | | Flat | 1.0 | Germanium |
| 9 | | | Flat | 3.0 | |
| | Image plane | | — | | |

TABLE 18

| | Aspherical surface 91 | Aspherical surface 92 |
|---|---|---|
| Paraxial radius of curvature R | 19.14 | 13.45 |
| Conic constant k | 0 | 0 |
| Fourth-order coefficient A | −2.2E−06 | −1.0E−05 |
| Sixth-order coefficient B | −1.3E−08 | −6.5E−09 |
| Eighth-order coefficient C | 1.8E−10 | −7.8E−10 |
| Tenth-order coefficient D | −2.9E−12 | 7.8E−12 |
| Twelfth-order coefficient E | 1.7E−14 | −7.1E−14 |
| Fourteenth-order coefficient F | −4.1E−17 | 1.5E−16 |

TABLE 19

| Surface number | Object surface | | Radius of curvature | Interval Infinite | Glass material |
|---|---|---|---|---|---|
| 1 | L101 | | 15.90 | 1.4 | Silicon |
| 2 | | Aspherical surface 101 | 16.53 | 14.1 | |
| 3 | Stop | | Flat | 2.4 | |
| 4 | L102 | | 12.80 | 4.0 | Germanium |
| 5 | | Aspherical surface 102 | 10.69 | 2.8 | |
| 6 | L103 | | 43.31 | 1.0 | Silicon |
| 7 | | | 88.52 | 2.1 | |
| 8 | L104 | | 34.13977 | 1 | Silicon |
| 9 | | | 60.35274 | 2 | |
| 10 | CG10 | | Flat | 1 | Germanium |
| 11 | | | Flat | 3 | |
| | Image plane | | | | |

TABLE 20

| | Aspherical surface 101 | Aspherical surface 102 |
|---|---|---|
| Paraxial radius of curvature R | 16.53 | 10.69 |
| Conic constant k | 0 | 0 |
| Fourth-order coefficient A | 4.6E−06 | 2.4E−05 |
| Sixth-order coefficient B | −5.8E−09 | 4.8E−07 |
| Eighth-order coefficient C | 5.8E−10 | −1.5E−08 |
| Tenth-order coefficient D | −1.4E−11 | 5.7E−10 |
| Twelfth-order coefficient E | 2.0E−13 | −9.6E−12 |
| Fourteenth-order coefficient F | −1.2E−15 | 7.7E−14 |
| Sixteenth-order coefficient G | 2.94E−18 | −1.44E−16 |

TABLE 21

| | Germanium | Silicon | Chalcogenide | Zinc sulfide | Zinc selenide |
|---|---|---|---|---|---|
| Refractive index N10 | 4.0 | 3.4 | 2.5 | 2.2 | 2.4 |
| Dispersion value v10 | 861 | 1,860 | 109 | 23 | 57 |

TABLE 22

| Conditional Expression | Embodiment | | | | | | | | | |
|---|---|---|---|---|---|---|---|---|---|---|
| | 1 | 2 | 3 | 4 | 5 | 6 | 7 | 8 | 9 | 10 |
| (1) 0.9 < D/f < 2.0 | 1.24 | 0.94 | 1.14 | 1.44 | 1.38 | 1.01 | 1.13 | 0.98 | 0.99 | 0.92 |
| (2) 0.1 < f2/f1 < 3.0 | 0.39 | 0.69 | 0.64 | 0.35 | 0.22 | 1.09 | 0.82 | 1.08 | 1.05 | 0.75 |
| (3) 1.0 < f1/f < 6.0 | 2.46 | 1.83 | 1.84 | 2.33 | 4.30 | 3.19 | 3.79 | 3.32 | 3.23 | 3.74 |
| (4) 0.5 < f2/f < 6.0 | 0.97 | 1.26 | 1.17 | 0.81 | 0.95 | 3.47 | 3.10 | 3.57 | 3.40 | 2.80 |
| (5) 0.1 < f3/f2 < 2.0 | — | — | — | — | — | 0.26 | 0.28 | 0.25 | 0.26 | 0.69 |
| (6) 0.1 < f3/f < 3.0 | — | — | — | — | — | 0.90 | 0.86 | 0.88 | 0.89 | 1.92 |
| (7) 0.001 < t1/f1 < 0.065 | 0.03 | 0.04 | 0.04 | 0.02 | 0.02 | 0.03 | 0.02 | 0.03 | 0.03 | 0.02 |
| f | 25.00 | 25.00 | 25.00 | 40.00 | 20.00 | 18.00 | 18.00 | 18.00 | 18.00 | 18.00 |
| f1 | 61.48 | 45.81 | 45.88 | 93.39 | 86.04 | 57.38 | 68.20 | 59.68 | 58.11 | 67.37 |
| f2 | 24.15 | 31.54 | 29.36 | 32.37 | 18.97 | 62.45 | 55.81 | 64.24 | 61.18 | 50.41 |
| f3 | — | — | — | — | — | 16.27 | 15.55 | 15.75 | 16.07 | 34.55 |
| f4 | — | — | — | — | — | — | — | — | — | 31.68 |
| D | 31.07 | 23.60 | 28.50 | 57.70 | 27.50 | 18.10 | 20.40 | 17.70 | 17.90 | 16.50 |
| t1 | 2.00 | 2.00 | 2.00 | 2.00 | 2.00 | 1.50 | 1.50 | 1.50 | 1.50 | 1.50 |

According to the present invention, it is possible to obtain, with a simple lens configuration, the optical system capable of easily achieving high optical performance even in an infrared range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-124914, filed Jun. 27, 2017, and Japanese Patent Application No. 2018-024598, filed Feb. 15, 2018 which are hereby incorporated by reference herein in their entirety.

What is claimed is:

1. An optical system comprising, in order from an object side to an image side:
   a first lens having a positive refractive power and having a meniscus shape with a convex surface facing the object side; and
   a second lens having a positive refractive power and having a meniscus shape with a convex surface facing the object side,
   wherein the first lens is made of a silicon material,
   wherein the second lens is made of one of a silicon material and a germanium material, and
   wherein the conditional expression:

$0.90 < D/f < 2.00$, is satisfied where f represents a focal length of the optical system, and D represents a distance on an optical axis between the first lens and the second lens.

2. The optical system according to claim 1, wherein the conditional expression:

$0.1 < f2/f1 < 3.0$, is satisfied where f1 represents a focal length of the first lens, and f2 represents a focal length of the second lens.

3. The optical system according to claim 1, wherein the conditional expression:

$1.0 < f1/f < 6.0$, is satisfied where f1 represents a focal length of the first lens.

4. The optical system according to claim 1, wherein the conditional expression:

$0.5 < f2/f < 6.0$, is satisfied where f2 represents a focal length of the second lens.

5. The optical system according to claim 1, wherein the conditional expression:

$0.001 < t1/f1 < 0.065$, is satisfied where f1 represents a focal length of the first lens, and t1 represents a thickness of the first lens.

6. The optical system according to claim 1,
   wherein the optical system consists of the first lens and the second lens, and
   wherein the second lens is made of a germanium material.

7. The optical system according to claim 1,
   wherein the optical system consists of, in order from the object side to the image side, the first lens, the second lens, and a third lens having a positive refractive power and having a convex surface facing the object side, and
   wherein the third lens is made of one of a silicon material and a germanium material.

8. The optical system according to claim 1,
   wherein the optical system consists of, in order from the object side to the image side, the first lens, the second lens, a third lens having a positive refractive power and having a convex surface facing the object side, and a fourth lens having a positive refractive power and having a convex surface facing the object side, and
   wherein the fourth lens is made of one of a silicon material and a germanium material.

9. The optical system according to claim 7, wherein the conditional expression:

$0.1 < f3/f2 < 2.0$, is satisfied where f2 represents a focal length of the second lens, and f3 represents a focal length of the third lens.

10. The optical system according to claim 7, wherein the conditional expression:

$0.1 < f3/f < 3.0$, is satisfied where f3 represents a focal length of the third lens.

11. An image pickup apparatus comprising:
    an optical system; and
    an image pickup element configured to photoelectrically convert an image formed by the optical system,
    wherein the optical system includes, in order from an object side to an image side:

a first lens having a positive refractive power and having a meniscus shape with a convex surface facing the object side; and a second lens having a positive refractive power and having a meniscus shape with a convex surface facing the object side, wherein the first lens is made of a silicon material, wherein the second lens is made of one of a silicon material and a germanium material, and wherein the following conditional expression is satisfied:

$$0.90 < D/f < 2.00,$$

where f represents a focal length of the optical system, and D represents a distance on an optical axis between the first lens and the second lens.

* * * * *